United States Patent
St. Pierre et al.

(10) Patent No.: US 11,916,927 B2
(45) Date of Patent: Feb. 27, 2024

(54) SYSTEMS AND METHODS FOR ACCELERATING A DISPOSITION OF DIGITAL DISPUTE EVENTS IN A MACHINE LEARNING-BASED DIGITAL THREAT MITIGATION PLATFORM

(71) Applicant: Sift Science, Inc., San Francisco, CA (US)

(72) Inventors: Eric St. Pierre, Salt Lake City, UT (US); Alex Forbess, Salt Lake City, UT (US)

(73) Assignee: Sift Science, Inc., San Francisco, CA (US)

( * ) Notice: Subject to any disclaimer, the term of this patent is extended or adjusted under 35 U.S.C. 154(b) by 0 days.

(21) Appl. No.: 17/981,830

(22) Filed: Nov. 7, 2022

(65) Prior Publication Data

US 2023/0144173 A1  May 11, 2023

Related U.S. Application Data

(60) Provisional application No. 63/277,535, filed on Nov. 9, 2021.

(51) Int. Cl.
*H04L 9/40* (2022.01)
*G06Q 20/40* (2012.01)

(52) U.S. Cl.
CPC ..... *H04L 63/1408* (2013.01); *G06Q 20/4016* (2013.01)

(58) Field of Classification Search
CPC .............. G06Q 20/4016; H04L 63/1408
See application file for complete search history.

(56) References Cited

U.S. PATENT DOCUMENTS

| | | | | |
|---|---|---|---|---|
| 7,263,506 B2* | 8/2007 | Lee | ..... | G06Q 20/4016 705/318 |
| 7,356,516 B2* | 4/2008 | Richey | ..... | G06Q 30/0253 705/16 |
| 8,065,233 B2* | 11/2011 | Lee | ..... | G06Q 20/10 705/76 |
| 8,515,792 B2* | 8/2013 | Agarwala | ..... | G06Q 40/12 705/410 |
| 9,954,879 B1* | 4/2018 | Sadaghiani | ..... | H04L 63/1416 |
| 9,978,067 B1* | 5/2018 | Sadaghiani | ..... | H04L 63/1416 |

(Continued)

*Primary Examiner* — Sharon S Lynch
(74) *Attorney, Agent, or Firm* — Padowithz Alce; Chandler Scheitlin; Alce PLLC

(57) ABSTRACT

A system and method for accelerating a disposition of a digital dispute event includes routing a digital dispute event to one of a plurality of distinct machine learning-based dispute scoring models; computing, by the one of the plurality of distinct machine learning-based dispute scoring models, a preliminary machine learning-based dispute inference based on one or more features extracted from the digital dispute event, wherein the preliminary machine learning-based dispute inference relates to a probability of the subscriber prevailing against the digital dispute event based on each piece of evidence data of a service-proposed corpus of evidence data being available to include in a dispute response artifact; and generating the dispute response artifact based on the digital dispute event, wherein the generating includes installing one or more obtainable pieces of evidence data associated with the digital event into one or more distinct sections of the dispute response artifact.

16 Claims, 13 Drawing Sheets

(56) References Cited

U.S. PATENT DOCUMENTS

| | | | |
|---|---|---|---|
| 10,108,962 B1* | 10/2018 | Sadaghiani | G06N 20/20 |
| 10,157,352 B1* | 12/2018 | Chan | G06N 5/047 |
| 10,284,582 B2* | 5/2019 | Sadaghiani | G06F 16/285 |
| 10,296,912 B2* | 5/2019 | Sadaghiani | G06N 20/00 |
| 10,402,828 B2* | 9/2019 | Sadaghiani | H04L 63/1416 |
| 10,643,216 B2* | 5/2020 | Sadaghiani | H04L 63/1416 |
| 10,825,012 B1* | 11/2020 | Senci | G06N 20/00 |
| 10,839,394 B2* | 11/2020 | Jia | G06N 20/00 |
| 11,037,158 B2* | 6/2021 | Lai | G06Q 20/407 |
| 11,321,631 B1* | 5/2022 | Chan | G06F 16/22 |
| 2002/0099649 A1* | 7/2002 | Lee | G06Q 20/4016 705/38 |
| 2008/0046334 A1* | 2/2008 | Lee | G06Q 30/0185 705/318 |
| 2008/0154783 A1* | 6/2008 | Rule | G06Q 50/188 705/80 |
| 2010/0114774 A1* | 5/2010 | Linaman | G06Q 40/02 705/44 |
| 2013/0297492 A1* | 11/2013 | Ertresvaag | G06Q 20/389 705/39 |
| 2014/0279312 A1* | 9/2014 | Mason | G06Q 20/407 705/30 |
| 2017/0053278 A1* | 2/2017 | Gerard | G06Q 20/407 |
| 2017/0200164 A1* | 7/2017 | Choi | G06N 20/00 |
| 2017/0286962 A1* | 10/2017 | Lai | G06Q 20/4016 |
| 2019/0020668 A1* | 1/2019 | Sadaghiani | H04L 63/1416 |
| 2019/0034932 A1* | 1/2019 | Sadaghiani | G06N 20/00 |
| 2019/0213595 A1* | 7/2019 | Sadaghiani | G06N 20/20 |
| 2019/0236610 A1* | 8/2019 | Sadaghiani | G06F 16/285 |
| 2019/0379595 A1* | 12/2019 | Ur | G06N 3/08 |
| 2020/0134628 A1* | 4/2020 | Jia | G06N 20/00 |
| 2022/0147954 A1* | 5/2022 | Mohan | G06Q 20/102 |
| 2022/0230174 A1* | 7/2022 | Khare | H04L 9/3297 |
| 2022/0309507 A1* | 9/2022 | Ross | G06N 7/01 |

* cited by examiner

200

Identifying one or more Transaction Disputes S210

Classifying and Baseline Dispute Scoring of the one or more Transaction Disputes S220

Generating a Corpus of Transaction Data and/or a Corpus of Evidence Data for the one or more Transaction Disputes S230

Re-Scoring a Dispute Score for the one or more Transaction Disputes S240

Intelligently Routing of the one or more Transaction Disputes based on Dispute Scores S250

FIGURE 2

SYSTEMS AND METHODS FOR ACCELERATING A DISPOSITION OF DIGITAL DISPUTE EVENTS IN A MACHINE LEARNING-BASED DIGITAL THREAT MITIGATION PLATFORM

CROSS-REFERENCE TO RELATED APPLICATIONS

This application claims the benefit of U.S. Provisional Application No. 63/277,535, filed 9 Nov. 2021, which is incorporated in its entirety by this reference.

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enable entities to engage and perform an incalculable number of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

BRIEF SUMMARY OF THE INVENTION(S)

In one or more embodiments, a machine learning-based method for accelerating a disposition of an inbound digital dispute event includes identifying, by one or more computers, a digital dispute event associated with a digital event that occurred between a target online user and a subscriber to a digital threat mitigation service; routing, by the one or more computers, the digital dispute event to one of a plurality of distinct machine learning-based dispute scoring models based on the digital dispute event satisfying a routing protocol of a hierarchical digital dispute routing matrix; computing, by the one of the plurality of distinct machine learning-based dispute scoring models, a preliminary machine learning-based dispute inference based on one or more features extracted from the digital dispute event, wherein: the preliminary machine learning-based dispute inference relates to a probability of the subscriber prevailing against the digital dispute event based on each piece of evidence data of a service-proposed corpus of evidence data being available to include in a dispute response artifact; generating the dispute response artifact based on the digital dispute event, wherein the generating includes installing one or more obtainable pieces of evidence data associated with the digital event into one or more distinct dispute response sections of the dispute response artifact; computing, by the one of the plurality of distinct machine learning-based digital dispute scoring models, an updated machine learning-based dispute inference for the digital dispute event based on a current state of the evidence data included in the dispute response artifact; and transmitting, by the one or more computers, the dispute response artifact to a target entity based on the updated machine learning-based dispute inference satisfying a dispute response submittal criterion.

In one or more embodiments, each of the one or more obtainable pieces of evidence data corresponds to an informative or probative piece of data that increases a likelihood of the target entity determining the digital event as a valid digital event.

In one or more embodiments, the preliminary machine learning-based dispute inference comprises a preliminary dispute score value; and the updated machine learning-based dispute inference comprises an updated dispute score value.

In one or more embodiments, the plurality of distinct machine learning-based dispute scoring models include: a plurality of distinct subscriber-specific machine learning-based dispute scoring models, wherein each of the plurality of distinct subscriber-specific machine learning-based dispute scoring models is trained on historical dispute response data of a distinct subscriber; and a plurality of distinct subscriber-agnostic machine learning-based dispute scoring models, wherein each of the plurality of distinct subscriber-agnostic machine learning-based dispute scoring models is trained on historical dispute response data of a distinct digital event processor.

In one or more embodiments, routing the digital dispute event to the one of the plurality of distinct machine learning-based dispute scoring models includes one of: routing the digital dispute event to a subscriber-specific machine learning-based dispute scoring model of the plurality of distinct subscriber-specific machine learning-based dispute scoring models that corresponds to the subscriber involved in the digital dispute event, and routing the digital dispute event to a subscriber-agnostic machine learning-based dispute scoring model of the plurality of distinct subscriber-agnostic machine learning-based dispute scoring models that corresponds to a digital event processor involved in the digital dispute event.

In one or more embodiments, the hierarchical digital dispute routing matrix includes a plurality of distinct routing protocols in a predetermined routing sequence that prioritizes the routing of the digital dispute event to the subscriber-specific machine learning-based dispute scoring model over the subscriber-agnostic machine learning-based dispute scoring model.

In one or more embodiments, the method includes displaying, on a web-based user interface of the digital threat mitigation service, the dispute response artifact and a dispute response insights user interface element, wherein the dispute response insight user interface element indicates one or more probative pieces of evidence data missing in the dispute response artifact that, if included in the dispute response artifact, increases a likelihood of the subscriber prevailing against the digital dispute event.

In one or more embodiments, the method includes visually emphasizing, on the web-based user interface, a selective subset of distinct dispute response sections of the one or more distinct dispute response sections that map to the one or more probative pieces of evidence data missing in the dispute response artifact, wherein visually emphasizing the selective subset of distinct dispute response sections indicates to the subscriber where to include one or more additional pieces of evidence data based on the dispute response insights user interface element.

In one or more embodiments, the method includes displaying, via a web-based user interface of the digital threat mitigation service, a representation of the dispute response artifact that includes: each of the plurality of distinct dispute response sections of the dispute response artifact; each obtainable piece of evidence data of the one or more obtainable pieces of evidence data included in the one or more distinct dispute response sections of the dispute response artifact; a dispute response insights user interface element integrally displayed within the representation of the dispute response artifact.

In one or more embodiments, the dispute response insights user interface element includes: an evidence deficiency data structure that includes a distinct evidence domain-to-evidence summary mapping for each distinct piece of evidence data of the service-proposed corpus of evidence data underrepresented in the dispute response artifact; and a textual dispute response summary that indicates a current probability of the subscriber prevailing against the digital dispute event based on the current state of the evidence data included in the dispute response artifact and a forward-looking probability of the subscriber prevailing against the digital dispute event if the dispute response artifact is augmented to include one or more additional pieces of evidence data that resolves each distinct evidence-to-evidence domain summary mapping of the evidence deficiency data structure.

In one or more embodiments, the method includes evaluating the one or more obtainable pieces of evidence data included in the dispute response artifact against the service-proposed corpus of evidence data; identifying that the one or more one or more obtainable pieces of evidence data included in the dispute response artifact excludes at least a subset of evidence data of the service-proposed corpus of evidence data based on the evaluation; and wherein the computing of the updated machine learning-based dispute inference is further based on the identifying.

In one or more embodiments, a machine learning-based method for accelerating a disposition of an inbound digital dispute event includes: identifying, by one or more computers, a digital dispute event associated with a digital event that occurred between a target online user and a subscriber to a digital threat mitigation service; routing, by the one or more computers, the digital dispute event to one of a plurality of distinct machine learning-based digital dispute scoring models based on a routing protocol of a digital dispute routing matrix; computing, by the one of the plurality of distinct machine learning-based digital dispute scoring models, a machine learning-based dispute inference based on one or more features extracted from the digital dispute event, wherein: the machine learning-based dispute inference relates to a probability of the subscriber prevailing against the digital dispute event if at least one piece of evidence data is available for each of a plurality of distinct evidence categories contributing to the computation of the machine learning-based dispute inference; instantiating, based on the digital dispute event, a dispute response artifact that includes a plurality of distinct dispute response sections that map to the plurality of distinct evidence categories; and generating, based on the dispute response artifact, a dispute-specific response artifact by installing one or more obtainable pieces of evidence data associated with the digital event into at least a subset of the plurality of distinct dispute response sections of the dispute response artifact to prove the historical digital event as a valid digital event.

In one or more embodiments, each of the one or more obtainable pieces of evidence data corresponds to an informative or probative piece of data that increases a likelihood of the subscriber prevailing against the digital dispute event.

In one or more embodiments, the method includes extracting, by the one or more computers, a plurality of distinct metadata attributes associated with the digital dispute event; automatically executing, by the one or more computers, one or more distinct application programming interface (API) calls using, at least, a subset of the plurality of distinct metadata attributes as API search parameters; in response to automatically executing the one or more distinct application programming interface calls, generating one or more corpora of evidence data based on a return of evidence data by each respective application programming interface call of the one or more distinct application programming interface calls.

In one or more embodiments, the machine learning-based dispute inference comprises a dispute score value, and the machine learning-based method further comprises: executing, by one or more computers, an automated dispute response workflow that automatically generates the dispute-specific response artifact based on the one or more corpora of evidence data and automatically transmits the dispute-specific response artifact to a target entity based on the dispute score value satisfying a dispute score threshold value.

In one or more embodiments, the method includes extracting, by the one or more computers, a target piece of metadata from the digital dispute event; and executing, by one or more computers, an automated dispute response workflow that automatically generates the dispute-specific response artifact based on the one or more corpora of evidence data and automatically transmits the dispute-specific response artifact to a target entity based on the target piece of metadata satisfying a workflow execution condition of the automated dispute response workflow.

In one or more embodiments, the method includes displaying, on a web-based user interface of the digital threat mitigation service, a digital dispute queue that includes a plurality of distinct representations of digital dispute events associated with the subscriber; and wherein the identifying the digital dispute event is based on receiving, via the web-based user interface, an input from the subscriber selecting a distinct representation of the plurality of distinct representations of digital dispute events that corresponds to the digital dispute event.

In one or more embodiments, routing the digital dispute event to the one of the plurality of distinct machine learning-based dispute scoring models includes one of: routing the digital dispute event to a subscriber-specific machine learning-based dispute scoring model if the subscriber has historically prevailed in historical digital dispute events that are analogous to the digital dispute event; and routing the digital dispute event to a subscriber-agnostic machine learning-based dispute scoring model if the subscriber has historically underperformed in historical digital dispute events that are analogous to the digital dispute event.

In one or more embodiments, a machine learning-based method for accelerating a disposition of an inbound digital dispute event includes routing, by one or more computers, a digital dispute event to one of a plurality of distinct machine learning-based dispute scoring models; computing, by the one of the plurality of distinct machine learning-based dispute scoring models, a preliminary machine learning-based dispute inference based on one or more features extracted from the digital dispute event, wherein: the preliminary machine learning-based dispute inference relates to a probability of the subscriber prevailing against the digital dispute event based on each piece of evidence data of a service-proposed corpus of evidence data being available to include in a dispute response artifact; generating the dispute response artifact based on the digital dispute event, wherein the generating includes installing one or more obtainable pieces of evidence data associated with the digital event into one or more distinct sections of the dispute response artifact; and transmitting, by the one or more computers, the dispute response artifact to a target entity based on the dispute response artifact satisfying a dispute response submittal criterion.

BRIEF DESCRIPTION OF THE FIGURES

FIG. 2 illustrates an example method in accordance with one or more embodiments of the present application;

DESCRIPTION OF THE PREFERRED EMBODIMENTS

Figure 1:
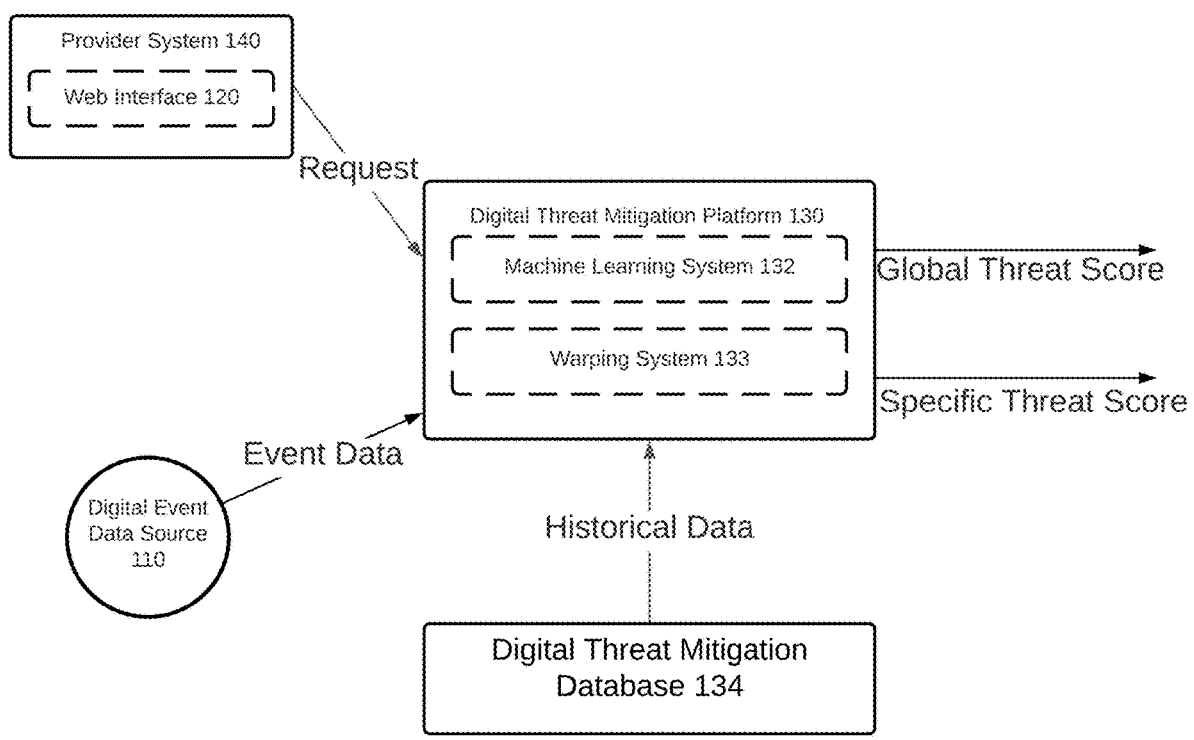
FIG. 1 illustrates a schematic representation of a system in accordance with one or more embodiments of the present application.

The following description of the preferred embodiments of the present application are not intended to limit the inventions to these preferred embodiments, but rather to enable any person skilled in the art to make and use these inventions.

Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities, as described in U.S. Pat. No. 9,954,879, which is incorporated herein in its entirety by this reference.

The advanced technology platform of many embodiments of the present application employs a robust ensemble of machine learning models and related systems that operate to ingest the great number of digital activities performed and events occurring over the web. Accordingly, using these finely tuned and perpetually evolving and tunable machine learning models, a system implementing the several embodiments of the present application can predict a threat level and/or classify a digital threat with high accuracy and, in some embodiments, in real-time (e.g., as the event is occurring or shortly thereafter) compute a digital threat score for each event or activity that is received by the system.

The digital threat score may be exposed via a score application program interface (API) that may function to interact with various endpoints of the digital threat mitigation platform. Specifically, the score API may function to interact with one or more computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current digital events to mitigate or eliminate a digital threat associated therewith. Additionally, or alternatively, in one or more embodiments, digital event data processing decisions may be automated via automated decisioning workflows, as described in U.S. Pat. No. 9,954,879, which is incorporated herein in its entirety by this reference and digital event data processing decisions may be performed with manual input from one or more human analysts or the like. In such embodiments, decisions output from one or more review queues of the one or more human analysts may be converted to training data for training and improving one or more threat classifying models of the threat mitigation service including, but not limited to, a unified threat model.

1. System for Digital Fraud and/or Abuse Detection and Scoring

As shown in FIG. 1, a system 100 for detecting digital fraud and/or digital abuse includes one or more digital event data sources 110, a web interface 120, a digital threat mitigation platform 130, and a service provider system 140.

The system 100 functions to enable a prediction of multiple types of digital abuse and/or digital fraud within a single stream of digital event data. The system 100 provides web interface 120 that enables subscribers to and/or customers of a threat mitigation service implementing the system 100 to generate a request for a global digital threat score and additionally, make a request for specific digital threat scores for varying digital abuse types. After or contemporaneously with receiving a request from the web interface 120, the system 100 may function to collect digital event data from the one or more digital event data sources 100. The system 100 using the digital threat mitigation platform 130 functions to generate a global digital threat score and one or more specific digital threat scores for one or more digital abuse types that may exist in the collected digital event data.

The one or more digital event data sources 110 function as sources of digital events data and digital activities data, occurring fully or in part over the Internet, the web, mobile applications, and the like. The one or more digital event data sources no may include a plurality of web servers and/or one or more data repositories associated with a plurality of service providers. Accordingly, the one or more digital event data sources no may also include the service provider system 140.

The one or more digital event data sources 110 function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, etc.) of the service providers. The digital events data and digital activities data collected by the one or more digital event data sources no may function as input data sources for a machine learning system 132 of the digital threat mitigation platform 130.

The digital threat mitigation platform 130 functions as an engine that implements at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to identify or classify features of the collected digital events data and digital activity data received from the one or more digital event data sources 110. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data and namely, to classify or detect features that may indicate a possibility of fraud and/or abuse. The machine learning system 132 may additionally utilize the input from the one or more digital event data sources 110 and various other data sources (e.g., outputs of system 100, system 100 derived knowledge data, external entity-maintained data, etc.) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, GPT, GPT-2, GPT-3, ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enables users of the digital resources associated with the service provider's online presence to perform transactions, exchanges of data, perform one or more digital activities, and the like.

The service provider 140 may include one or more web or private computing servers and/or web or private computing devices. Preferably, the service provider 140 includes one or more client devices functioning to operate the web interface 120 to interact with and/or communicate with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. Additionally, or alternatively, the web (client) interface 120 may be used to collect manual decisions with respect to a digital event processing decision, such as hold, deny, accept, additional review, and/or the like. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores. In some embodiments, the web interface 120 comprises an application programming interface (API) client and/or a client browser.

Additionally, the systems and methods described herein may implement the digital threat mitigation platform in accordance with the one or more embodiments described in the present application as well as in the one or more embodiments described in U.S. patent application Ser. No. 15/653,373, which is incorporated by reference in its entirety.

Figure 1A:
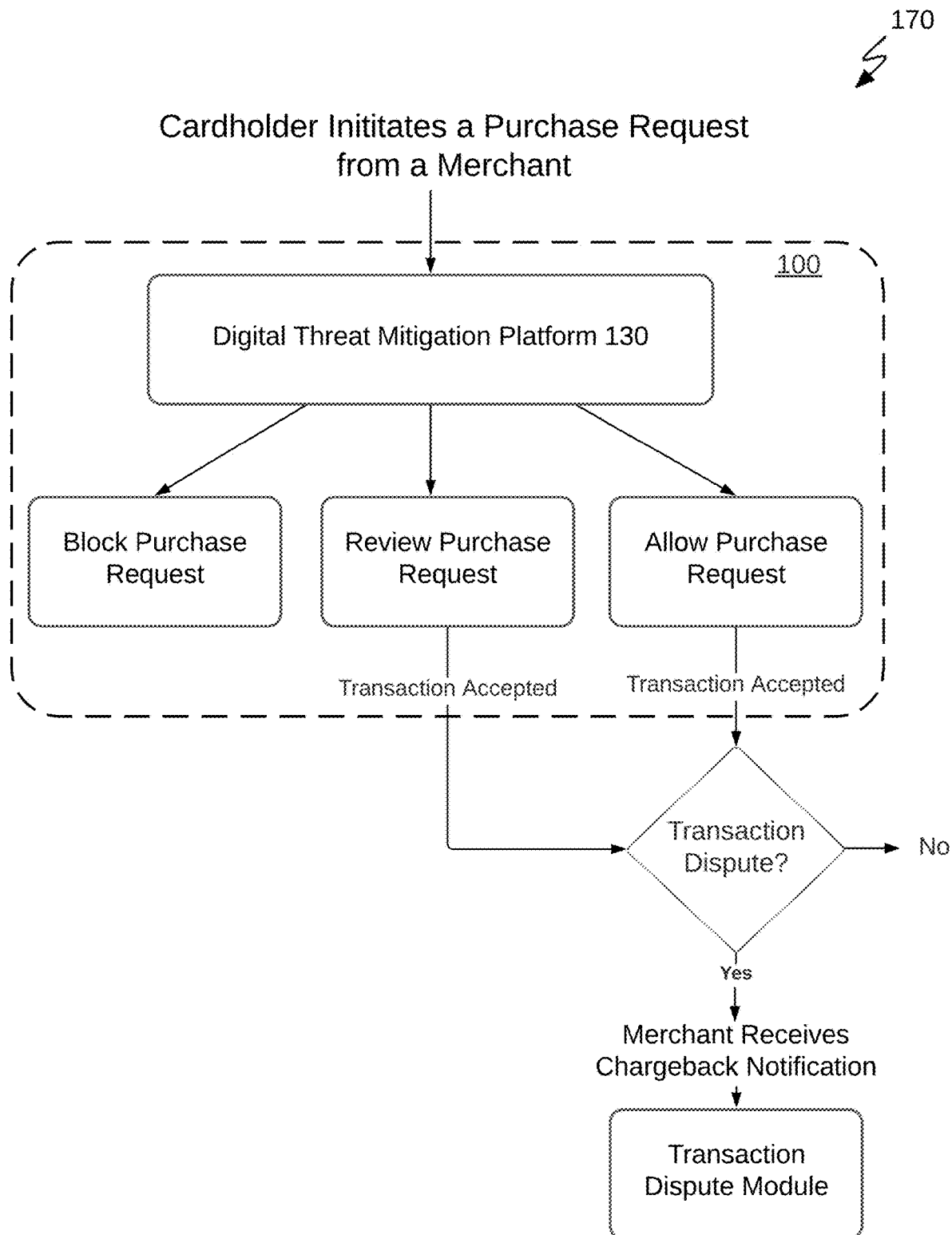
FIG. 1A illustrates a schematic representation of a subsystem of the system 100 in accordance with one or more embodiments of the present application.

Additionally, in some embodiments, in response to a digital threat mitigation platform 130 of the system 100 allowing a transaction (e.g., a digital event, a purchase request from a financial account user, or the like), the financial account user may subsequently dispute the transaction which may eventually lead to a merchant receiving a digital dispute event (e.g., a chargeback request, a chargeback notification, or the like). Thus, the system 100 may function to implement a subsystem 170 that may include a transaction dispute module that may intelligently identify, collect, and/or handle digital dispute events (e.g., chargeback disputes, digital transaction disputes, or the like), as shown generally by way of example in FIG. 1A and/or the method 200.

2. Methods for Machine Learning-Based Classification, Machine Learning-Based Scoring, and Machine Learning-Based Handling of Inbound Digital Dispute Events As shown in FIG. 2, the method 200 for intelligent dispute classification, dispute scoring, and dispute handling of inbound transaction disputes may include identifying one or more transaction disputes S210, classifying and scoring each of the one or more transaction disputes S220, generating a corpus of transaction data and/or a corpus of evidence data for each of the one or more transaction disputes S230, and intelligently routing each of the one or more transaction disputes based on a dispute score S250. The method may optionally include re-scoring a dispute score for the one or more transaction disputes S240.

In one or more implementations of the method 200, the method 200 may include implementing an extensible system of record, as described in U.S. patent application Ser. No. 17/497,820, filed on 8 Oct. 2021, titled SYSTEMS AND METHODS FOR IMPLEMENTING AN EXTENSIBLE SYSTEM OF RECORD IN A MACHINE LEARNING-BASED DIGITAL THREAT MITIGATION PLATFORM, which is incorporated herein in its entirety by this reference.

2.10 Identifying Inbound Transaction Disputes|Digital Dispute Events

Figure 3:
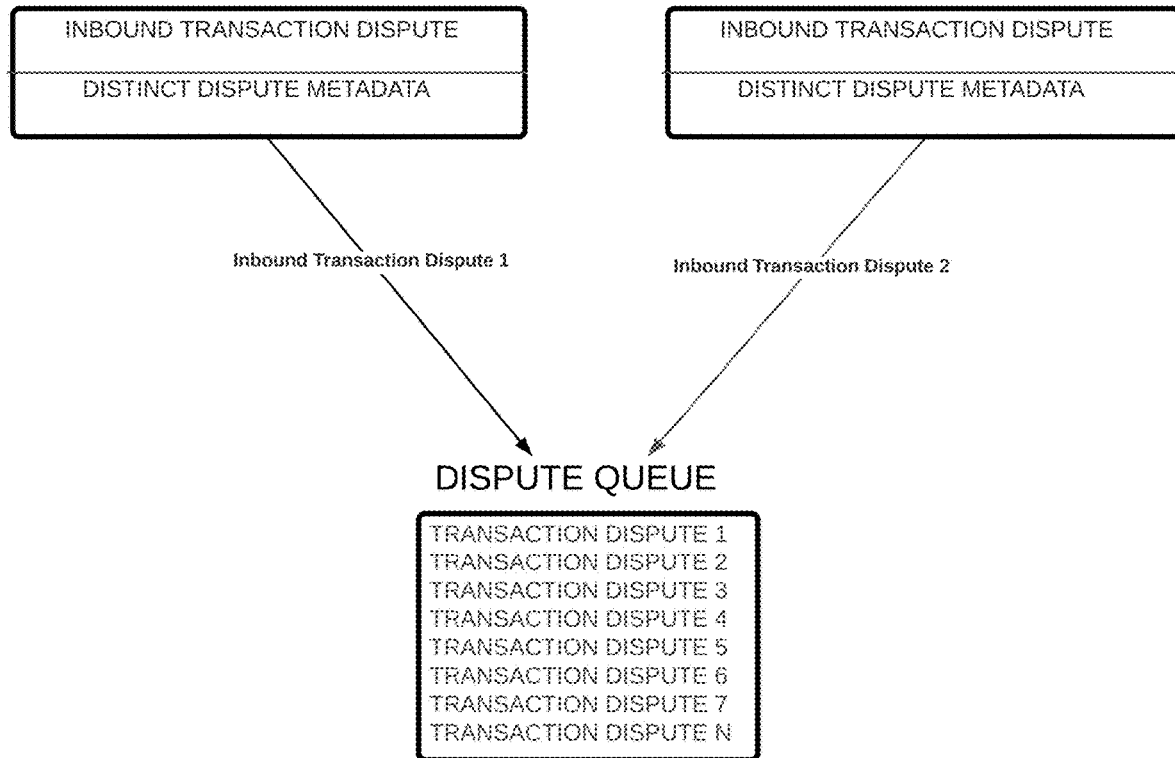
FIG. 3 illustrates an example representation of inbound transaction disputes and a dispute queue in accordance with one or more embodiments of the present application.

S210, which includes identifying inbound transaction disputes, may function to identify one or more transaction dispute requests and/or one or more transaction dispute notifications inbound to a service or system implementing the method 200. In a preferred embodiment, a transaction dispute may be a forced transaction reversal that returns a transaction amount to a financial account user after the financial account user disputes the transaction with an issuer of the credit card or debit card, which may also be referred to as a chargeback. It shall be noted that inbound transaction disputes (e.g., digital dispute events) may be received from one or more of a payment service provider (PSP), an issuing bank, and/or a chargeback service and S210 may function to electronically collect and/or electronically store inbound transaction disputes in a digital dispute queue operably interfacing with a service or system implementing the method 200, as shown generally by way of example in FIG. 3.

Figure 7:
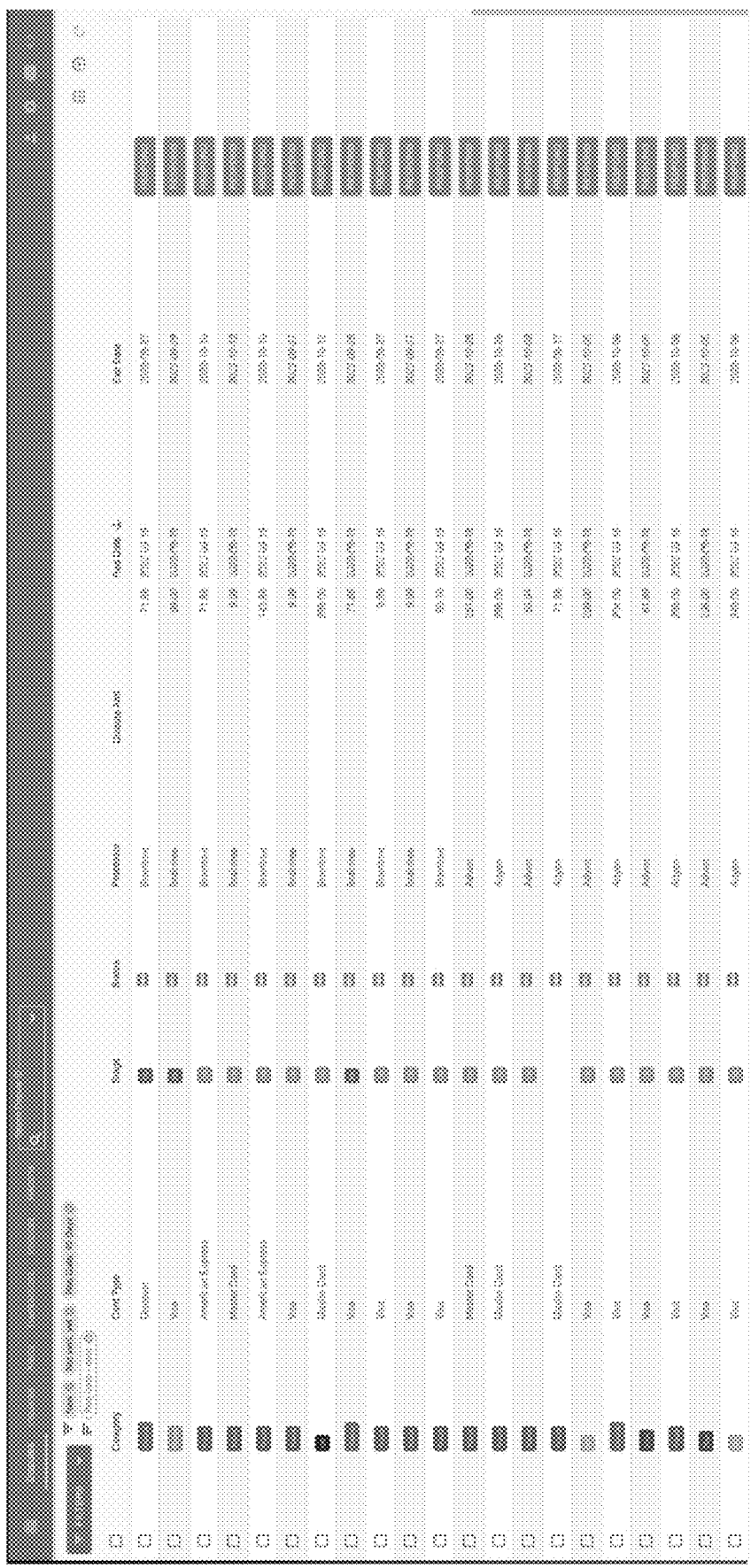
FIG. 7 illustrates an example representation of a graphical user interface displaying a plurality of distinct representations of digital dispute events in accordance with one or more embodiments of the present application.

In one or more embodiments, in response to a filing of a transaction dispute against an account charge or a digital transaction event, a payment service provider (PSP) may electronically notify a merchant involved in the transaction (e.g., digital event) and/or the merchant that posted the charge to an account statement of a financial account user by electronically sending the transaction dispute (e.g., digital dispute event) to a dispute queue accessible to the merchant via a web-based interface, as shown generally by way of example in FIG. 7.

In one or more embodiments, each distinct inbound transaction dispute (e.g., digital dispute event, transaction dispute event, etc.) may include one or more distinct pieces of dispute metadata. For instance, in a non-limiting example, a transaction dispute notification, a transaction dispute request, and/or a digital dispute event may include one or more of an issuance date of the dispute, a name of the merchant receiving the dispute, a dispute case number, a financial account number associated with the dispute, a name of the financial account user, an email address of the financial account user, a telephone number of the financial account user, a merchant identification number, a transaction date (e.g., sale date of the transaction), a transaction identification number associated with the dispute, a transaction amount, a dispute reason code, or the like. It shall be noted that the dispute metadata included in a digital dispute event may vary between payment service providers (PSP), issuing banks, and/or chargeback service providers.

In one or more embodiments, a dispute queue may automatically rearrange transaction disputes (e.g., digital dispute events) according to one or more prioritization criteria (e.g., a transaction amount at-risk, a time constraint for responding to a transaction dispute, an initial probability of prevailing in a transaction dispute, or the like) for intelligent processing of the transaction disputes (e.g., digital dispute events).

Additionally, or optionally, in one or more embodiments, one or more pieces of dispute metadata of a subject transaction dispute (e.g., digital dispute event) may intelligently inform the search parameters for collecting transaction data, event data, or the like from one or more internal and/or external data sources or data systems of a target merchant or subscriber, as will be described in more detail below.

2.20 Classifying and Baseline Dispute Scoring of Digital Dispute Events|Transaction Disputes S220, which includes classifying and scoring inbound transaction disputes, may function to classify a transaction dispute and compute a baseline dispute score for each of a plurality of distinct transaction disputes (e.g., digital dispute events or the like) digitally stored in a digital dispute queue. In one or more embodiments, S220 may function to implement one or more machine learning-based dispute classification models that may predict a dispute type for each distinct transaction dispute (e.g., each digital dispute event or the like) of a digital dispute queue. Additionally, in one or more embodiments, S220 may function to implement one or more machine learning-based dispute scoring models that may predict a baseline (or preliminary) dispute score for each distinct transaction dispute (e.g., each digital dispute event or the like) of a digital dispute queue. It shall be noted that the terms "dispute type" and "dispute classification" may be used interchangeably herein.

Classifying Transaction Disputes|Digital Dispute Events

Figure 4:
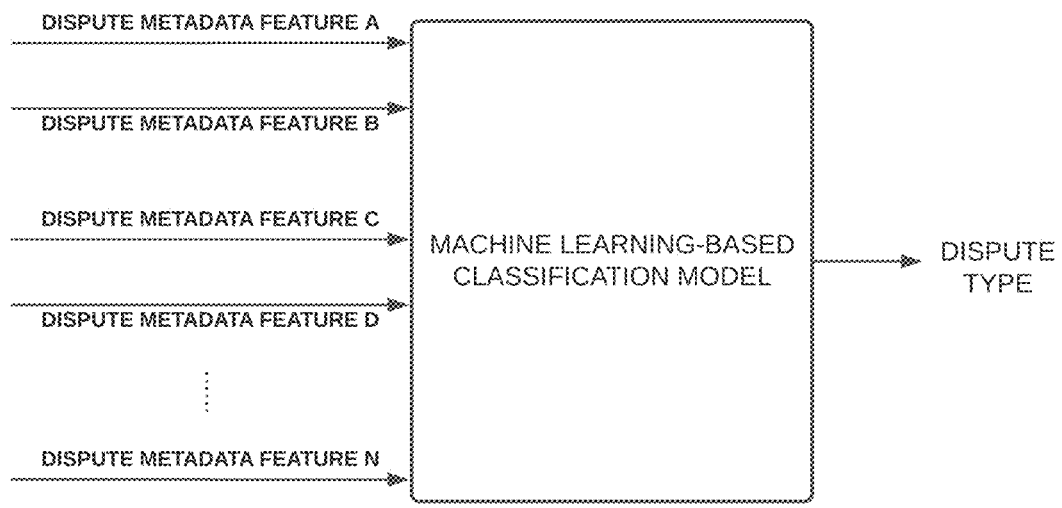
FIG. 4 illustrates an example schematic for classifying a transaction dispute in accordance with one or more embodiments of the present application.

In one or more embodiments, S220 may function to implement a machine learning-based dispute classification model or an ensemble of machine learning-based dispute classification models that may be designed and trained to classify transaction disputes or digital dispute events into one or more dispute types based on dispute features and/or metadata extracted from a subject digital dispute event, as shown generally by way of example in FIG. 4. In one or more embodiments, S220 may function to implement a feature extractor or a feature extractor system that may function to extract a feature dataset from dispute metadata of a target transaction dispute (or digital dispute event) that may be converted to a feature vector dataset and used as input into one or more machine learning-based dispute classification models. The one or more machine learning-based classification models may be computing against a given feature vector dataset to predict a dispute type classification label having the highest probability of matching a subject transaction dispute (or digital dispute event).

In other words, in one or more embodiments, the feature extractor or the feature extractor system may function to extract a corpus of prohibitive classification features (e.g., a dispute reason code, an issuing bank, or other relevant classification features) from dispute metadata of a transaction dispute (e.g., digital dispute event) that may be indicative of a dispute type or dispute classification, and the one or more machine learning-based classification models may be configured with learnable parameters mapped to the plurality of features of the extracted feature dataset to predict a dispute type.

Credit Not Processed Dispute Type

In one or more embodiments, a machine learning-based dispute type classification model or an ensemble of machine learning-based dispute type classification models may function to compute a dispute classification inference that indicates a subject transaction dispute or digital dispute event may be of a credit not processed dispute type. A credit not processed dispute type, as generally referred to herein, may be a category of a chargeback or digital dispute event related to a financial account user that claims to have returned or canceled a purchase but has yet to receive a credit or refund from the merchant or the subscriber for the returned product or canceled purchase. In such embodiments, S220 may function to classify a transaction dispute (or digital dispute event) as a credit not processed dispute type in response to a prediction or classification inference by a machine learning-based dispute type classification model or an ensemble of machine learning-based dispute type classification models that the transaction dispute (or the digital dispute event) may be of a credit not processed dispute type.

Duplicate Processing Dispute Type

Additionally, or alternatively, in one or more embodiments, a machine learning-based dispute type classification model or an ensemble of machine learning-based dispute type classification models may function to compute a dispute classification inference that indicates a subject transaction dispute (e.g., digital dispute event) may be of a duplicate processing dispute type. A duplicate processing dispute type, as generally referred to herein, may be a category of a chargeback (or digital dispute event) associated with a merchant or subscriber that may have charged a financial account user more than once for the same product or service. In such embodiments, S220 may function to classify a transaction dispute as a duplicate processing dispute type in response to a prediction or classification inference by a machine learning-based dispute type classification model or an ensemble of machine learning-based dispute type classification models that the transaction dispute may be of a duplicate processing dispute type.

Digital Fraud Dispute Type

Additionally, or alternatively, in one or more embodiments, a machine learning-based dispute type classification model or an ensemble of machine learning-based dispute type classification models may function to compute a dispute classification inference that indicates a subject transaction dispute (e.g., a digital dispute event or the like) may be of a fraudulent dispute type. A fraudulent dispute type, as generally referred to herein, may be a category of a chargeback (or digital dispute event) related to a transaction (e.g., digital event) that a financial account user may believe to be a fraudulent transaction (e.g., a transaction not authorized by a cardholder). In such embodiments, S220 may function to classify a target transaction dispute (e.g., digital dispute event) as a fraudulent dispute type in response to a prediction or classification inference by a machine learning-based dispute type classification model or an ensemble of machine learning-based dispute type classification models that the target transaction dispute (e.g., digital dispute event or the like) may be of a fraudulent dispute type.

Product Not Received Dispute Type

Additionally, or alternatively, in one or more embodiments, a machine learning-based dispute type classification model or an ensemble of machine learning-based dispute type classification models may function to compute a dispute classification inference that indicates a subject transaction dispute (e.g., digital dispute event) may be of a product not received dispute type. A product not received dispute type, as generally referred to herein, may be a category of a chargeback or digital dispute event related to a transaction (e.g., digital event) where the financial account user claims that the goods or services may not have been received or only a portion of the goods or services may have been received. In such embodiments, S220 may function to classify a target transaction dispute (e.g., digital dispute event) as a product not received dispute type in response to a prediction or classification inference by a machine learning-based dispute type classifier or an ensemble of machine learning-based dispute type classifiers that the target transaction dispute (e.g., digital dispute event) may be of a product not received dispute type.

Product Unacceptable Dispute Type

Additionally, or alternatively, in one or more embodiments, a machine learning-based dispute type classification model or an ensemble of machine learning-based dispute type classification models may function to compute a dispute classification inference that indicates a target transaction dispute (e.g., digital dispute event or the like) may be of a product unacceptable dispute type. A product unacceptable dispute type, as generally referred to herein, may be a category of a chargeback (or digital dispute event) related to a transaction (e.g., digital event or the like) where a financial account user asserts that the merchandise or service arrived damaged, defective, or not as described by the merchant or subscriber at the time of the transaction (e.g., digital event or the like). In such embodiments, S220 may function to classify a transaction dispute as a product unacceptable dispute type in response to a prediction or classification interference by a machine learning-based dispute type classification model or an ensemble of machine learning-based dispute type classification models that the transaction dispute may be of a product unacceptable dispute type.

Subscription Canceled Dispute Type

Additionally, or alternatively, in one or more embodiments, a machine learning-based dispute type classification model or an ensemble of machine learning-based dispute type classification models may function to compute a dispute classification inference that indicates a target transaction dispute (e.g., digital dispute event) may be of a subscription canceled dispute type. A subscription canceled dispute type, as generally referred to herein, may be a category of a chargeback (or digital dispute event) related to a transaction (e.g., digital event) where a financial account user claims that they have previously canceled a subscription, however, the merchant or subscriber is still charging for such subscription. In such embodiments, S220 may function to classify a transaction dispute (e.g., digital dispute event) as a subscription canceled dispute type in response to a prediction or classification inference by a machine learning-based dispute type classification model or an ensemble of machine learning-based dispute type classification models that the transaction dispute (e.g., digital dispute event) may be of a subscription canceled dispute type.

Unrecognized Dispute Type

Additionally, or alternatively, in one or more embodiments, a machine learning-based dispute type classification model or an ensemble of machine learning-based dispute type classification models may function to compute a dispute classification inference that indicates a target transaction dispute (e.g., digital dispute event or the like) may be of an unrecognized dispute type. An unrecognized dispute type, as generally referred to herein, may be a category of a chargeback (or digital dispute event) that relates to a transaction (e.g., digital event) where a financial account user may not recognize a transaction on their account statement, but does not believe their account information to be compromised. In such embodiments, S220 may function to classify a transaction dispute as an unrecognized dispute type in response to a prediction or inference by a machine learning-based dispute type classification model or an ensemble of machine learning-based dispute type classification models that the transaction dispute may be of an unrecognized dispute type.

At least one technical benefit of S220 predicting a dispute type for each distinct transaction dispute event (e.g., digital dispute event) inbound or stored in a digital dispute queue may intelligently inform the system 100 and/or the method 200 the type of transaction data and/or the type of evidence data to collect, source, and/or include in a dispute response to increase a probability of a subscriber prevailing in a subject disputed transaction event (e.g., a digital dispute event associated with a historical digital event that occurred between a subject user and the subscriber to the digital threat mitigation service).

Intelligent Routing of Digital Dispute Events

In one or more embodiments, S220 may function to automatically route, by one or more computers, a subject digital dispute event to one of a plurality of distinct machine learning-based dispute scoring models based on the subject digital dispute event satisfying a routing protocol of a hierarchical digital dispute routing matrix. In one or more embodiments, the plurality of distinct machine learning-based dispute scoring models may include a plurality of distinct subscriber-specific machine learning-based dispute scoring models in which each of the plurality of distinct subscriber-specific machine learning-based dispute scoring models may be trained on historical dispute response data of a distinct subscriber to the digital threat mitigation service and/or a plurality of distinct subscriber-agnostic machine learning-based dispute scoring models in which each of the plurality of distinct subscriber-agnostic machine learning-based dispute scoring models may be trained on historical dispute response data across a plurality of distinct subscribers that involves a distinct digital event processor.

In one or more embodiments, a structure of the hierarchical digital dispute routing matrix may include a plurality of distinct routing protocols in a predetermined sequence that prioritizes a routing of digital dispute events to a subscriber-specific machine learning-based dispute scoring model over a subscriber-agnostic machine learning-based dispute scoring model.

In one or more embodiments, based on receiving or identifying a subject digital dispute event, S220 may function to route the subject digital dispute event to a subscriber-specific machine learning-based dispute scoring model (of the plurality of distinct subscriber-specific machine learning-based dispute scoring models) that corresponds to the subscriber involved in the subject digital dispute event. At least one technical advantage of routing the subject digital dispute event to the subscriber-specific machine learning-based dispute scoring model may be that a likelihood or probability of the subscriber prevailing against the subject digital dispute event may be computed specifically for the subscriber as a training of the subscriber-specific machine learning-based dispute scoring model is based on historical dispute response data of the subscriber to which the model corresponds.

For instance, in a non-limiting example, based on a subject digital dispute event involving subscriber A, the subject digital dispute event may be routed to a distinct subscriber-specific machine learning-based dispute scoring model associated with subscriber A that may compute a machine learning-based dispute inference comprising a dispute score of ninety for the subject digital dispute event, which indicates that subscriber A has historically prevailed (e.g., won) in digital dispute events that are analogous to the subject digital dispute event. In another non-limiting example, based on a similar or substantially similar digital dispute event involving subscriber B, the subject digital dispute event may be routed to a distinct subscriber-specific machine learning-based dispute scoring model associated with subscriber B that may compute a machine learning-based dispute inference comprising a dispute score of sixty for the subject digital dispute event, which indicates that subscriber B has historically underperformed (e.g., lost) in digital dispute events that are analogous to the subject digital dispute event.

Additionally, or alternatively, in one or more embodiments, S220 may function to route a subject digital dispute event to a subscriber-specific machine learning-based dispute scoring model that corresponds to the subscriber involved in the subject digital dispute event based on an evaluation that the subscriber has historically prevailed in historical digital dispute events that are analogous to the subject digital dispute event. In other words, in accordance with a determination that a subscriber often prevails against digital dispute events of one or more distinct dispute types, S220 may function to route a subject digital dispute event that is of one of the one or more distinct dispute types to a subscriber-specific machine learning-based dispute scoring model as the subscriber-specific machine learning-based dispute scoring model has been trained on the pieces of evidence data included in one or more dispute responses that has caused the subscriber to prevail in such dispute cases (e.g., digital dispute events) of the one or more distinct dispute types. Accordingly, the subscriber-specific machine learning-based dispute scoring model may function to compute a dispute score and/or propose distinct pieces of evidence data (e.g., a service-proposed corpus of evidence data) to include in a dispute response for the subject digital dispute event based on a training of the subscriber-specific machine learning-based dispute scoring model.

In one or more embodiments, based on receiving or identifying a subject digital dispute event, S220 may function to route the subject digital dispute event to a subscriber-agnostic machine learning-based dispute scoring model (of the plurality of distinct subscriber-agnostic machine learning-based dispute scoring models) that corresponds to a digital event processor (e.g., Stripe, Braintree, etc.) involved in the digital dispute event.

Additionally, or alternatively, in one or more embodiments, S220 may function to route a subject digital dispute event to a subscriber-agnostic machine learning-based dispute scoring model that corresponds to a digital event processor (e.g., Stripe, Braintree, etc.) involved in the subject digital dispute event in accordance with a determination that the subscriber has historically underperformed in historical digital dispute events that are analogous to the digital dispute event.

At least one technical advantage of routing a subject digital dispute event to a subscriber-agnostic machine learning-based dispute scoring model may be that a likelihood or probability of prevailing against the subject digital dispute event may be computed based on a cohort that may share one or more characteristics with a subscriber involved in the subject digital dispute event.

For instance, in a non-limiting example, based on the subject digital dispute event involving subscriber A, the subject digital dispute event may be routed to a distinct subscriber-specific machine learning-based dispute scoring model associated with subscriber A that may compute a machine learning-based dispute inference comprising a dispute score of thirty for the subject digital dispute event, which indicates that subscriber A has historically underperformed (e.g., lost) in digital dispute events that are analogous to the subject digital dispute event. Accordingly, S220 may function to route the subject digital dispute event to a subscriber-agnostic machine learning-based dispute scoring model that corresponds to a digital event processor (e.g., Stripe, Braintree, etc.) involved in the subject digital dispute event that may compute a machine learning-based dispute inference comprising a dispute score of ninety for the subject digital dispute event, which indicates that subscribers to the digital threat mitigation service have historically prevailed in digital dispute events that are analogous to the subject digital dispute event.

In other words, in one or more embodiments, if a subscriber often receives loses against digital dispute events of a distinct dispute type, S220 may function to route a subject digital dispute event that is of the distinct dispute type to a subscriber-agnostic machine learning-based dispute scoring model as the subscriber-agnostic machine learning-based dispute scoring model may have been trained on pieces of evidence data included in dispute responses of one or more subscribers that have been successful against digital dispute events of the distinct dispute type. In such embodiments, the subscriber-agnostic machine learning-based dispute scoring model may function to compute a dispute score and/or propose distinct pieces of evidence data (e.g., a service-proposed corpus of evidence data) to include in a dispute response for the subject digital dispute event based on a training of the subscriber-agnostic machine learning-based dispute scoring model.

Baseline Scoring of Digital Dispute Events|Transaction Disputes

In one or more embodiments, based on a routing of a subject digital dispute event, S220 may function to implement one or more machine learning-based dispute scoring models that may function to compute a preliminary machine learning-based dispute inference that may include a preliminary dispute score for the subject digital dispute event. A baseline (or preliminary) dispute score, as generally referred to herein, may be a baseline or an initial dispute score that relates to a preliminary signal strength or an initial probability of likelihood of a subscriber involved in a subject digital dispute event prevailing against a disputed digital event (e.g., a low baseline dispute score (e.g., zero (0)-thirty (30)) may relate to a low probability of a subscriber prevailing against a disputed digital event or transaction and a high baseline dispute score (e.g., ninety (90)-one-hundred (100)) may relate to a high probability of a subscriber prevailing against a disputed digital event or transaction, as examples).

In first implementation, the one or more machine learning-based dispute scoring models implemented by S220 may function to predict a preliminary or baseline dispute score for a target transaction dispute (e.g., a target digital dispute event) based on input of one or more dispute metadata features (e.g., a bank identification number (BIN) of the financial account user, etc.), a dispute type of the target transaction dispute (e.g., the target digital dispute event), etc.). The computed baseline or preliminary dispute score for a digital dispute event may relate to a probability or likelihood of the subscriber prevailing against the digital dispute event based on each piece of a service-proposed corpus of evidence data being available to include in a dispute response. Stated another way, in one or more embodiments, the computed baseline (or preliminary) dispute score may be based on a forecast that evidence data related to a target (or service-recommend) evidence category, or a plurality of target (or service-recommended) evidence categories may be available or obtainable to include in a dispute response for a distinct transaction dispute (e.g., digital dispute event).

For example, in a non-limiting example, a computed baseline (or preliminary) dispute score of ninety (90) for a digital dispute event (e.g., transaction dispute event of a distinct dispute type and of a distinct bank identification number (BIN)) may imply that one or more distinct pieces of evidence data related to evidence category "A", evidence category "D", and evidence category "F" may be available or at least accessible to an analyst or a system or service implementing the method 200.

In a second implementation, via a machine learning-based dispute scoring model, S220 may function to compute a preliminary machine learning-based dispute inference that may comprise a preliminary dispute score based on one or more features extracted from a target digital dispute event. In such implementation, the preliminary distinct machine learning-based dispute inference may relate to a probability or likelihood of a subscriber associated with the target digital dispute event prevailing against the target digital dispute event based on each piece of evidence data of a service-proposed corpus of evidence data being available to include in a dispute response artifact.

In a third implementation, S220 may function to compute a preliminary dispute score for a target digital dispute event based on one or more attributes, characteristics, and/or metadata underpinning the target digital event. For instance, in a non-limiting example, based on determining one or more of the dispute type of the target digital dispute event, the bank identification number (BIN) involved in the target digital event, or other pieces of probative data, S220 may function to compute the preliminary dispute score that corresponds to a subscriber-specific historical success rate or a subscriber-agnostic historical success rate computed for historical digital dispute events analogous or substantially similar to the target digital dispute event.

Figure 10:
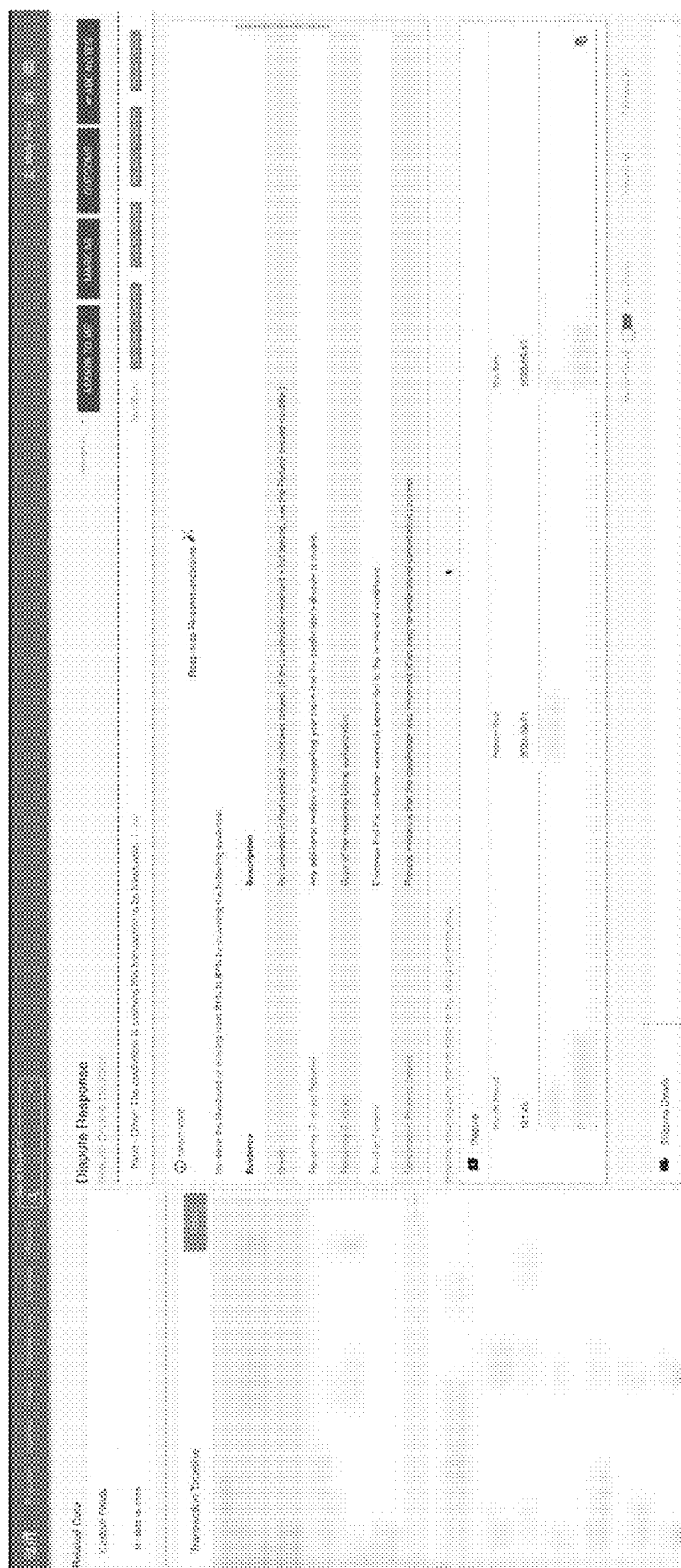
FIG. 10 illustrates an example representation of a graphical user interface displaying a dispute response insights user interface element in accordance with one or more embodiments of the present application.
Figure 11:
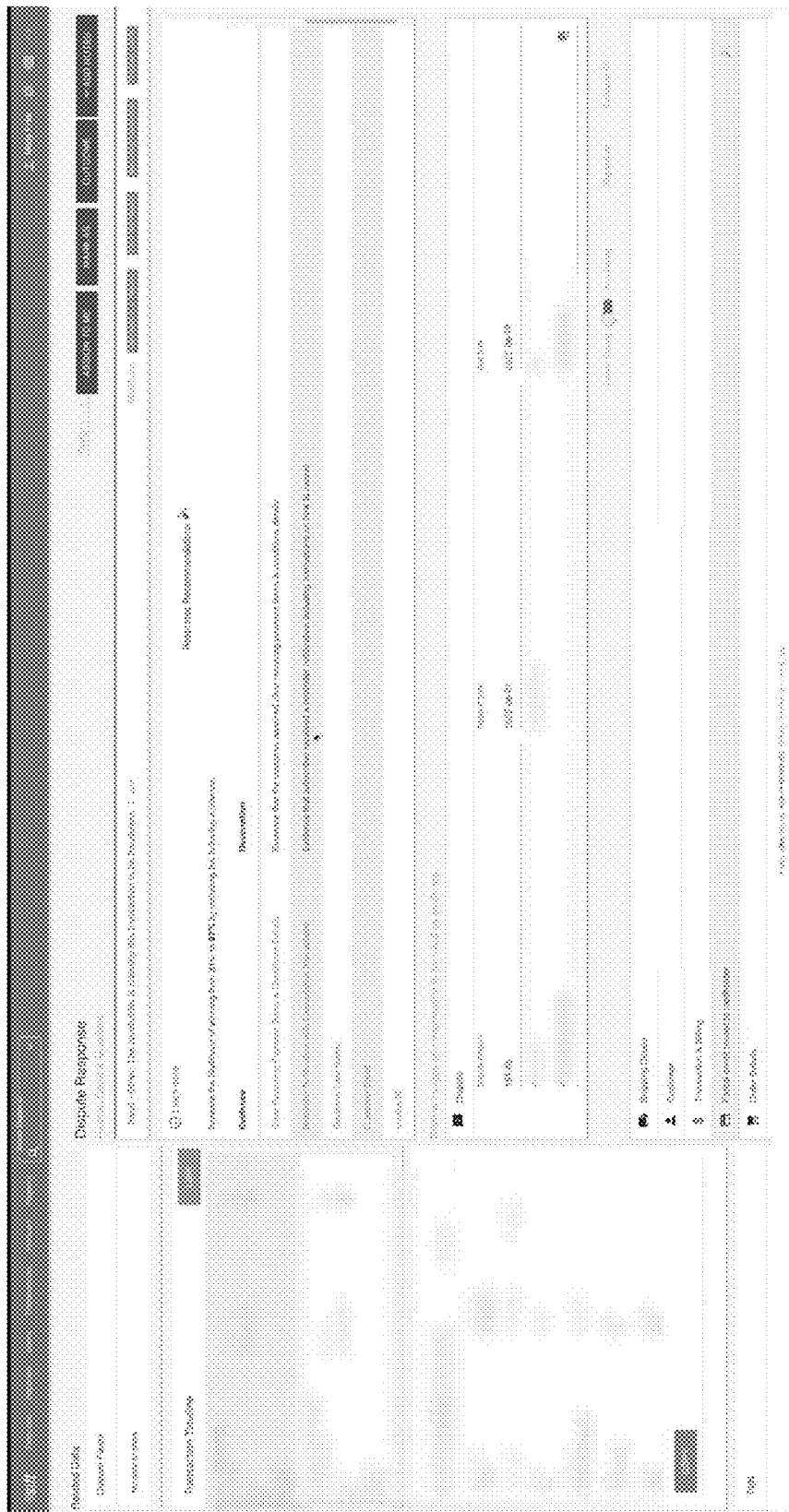
FIG. 11 illustrates an example representation of a graphical user interface displaying a dispute response insights user interface element and a dispute response artifact in accordance with one or more embodiments of the present application.

It shall be noted that, for each distinct transaction dispute or digital dispute event, the baseline (or preliminary) dispute score computed for a subject distinct transaction dispute along with a service-proposed corpus of evidence data comprising recommended evidence categories and/or evidence data to include in a dispute response may be displayed or exposed to a subscriber via a transaction dispute web-based interface or the like, as shown generally by way of example in FIG. 10 and FIG. 11.

It shall be further noted that in one or more embodiments, the one or more machine learning-based dispute scoring models may be similar or equivalent to the machine learning-based dispute scoring models as described below (e.g., in S240).

2.30 Generating one or more Corpora of Transaction Data and/or one or more Corpora of Evidence Data for a Distinct Transaction Dispute|Digital Dispute Event S230, which includes generating one or more distinct corpora of transaction data and/or one or more distinct corpora of evidence data for a distinct digital dispute event, may function to generate at least one distinct corpus of transaction data and/or at least one distinct corpus of evidence data for each distinct transaction dispute event (e.g., digital dispute event) of a dispute queue. In a preferred embodiment, one or more corpora of transaction data associated with a subject transaction dispute (e.g., a subject digital dispute event) may be automatically generated when one or more merchant data sources and/or systems (e.g., a merchant shipping system, a merchant fulfilment system, a merchant fraud detection system, etc.) may be configured to automatically communicate with a service or system implementing the method 200. Additionally, or alternatively, a corpus of transaction data associated with a transaction dispute may be manually generated by one or more analysts when one or more merchant systems may not be in automatic communication with a service or a system implementing the method 200.

It shall be noted that one or more pieces of dispute metadata of a transaction dispute (e.g., digital dispute event) may intelligently inform the search parameters for querying internal and/or external merchant data systems (or services) to generate a corpus of transaction data automatically, semi-automatically, or manually.

Automatic Generation of a Corpus of Transaction Data

In one or more implementations, S230 may function to automatically generate a corpus of transaction data for a subject digital dispute event using one or more application programming interfaces (APIs). In such implementations, the system 100 and/or the method 200 may automatically generate one or more API calls to one or more merchant data systems or databases that may facilitate and/or capture context around a digital event (e.g., digital transaction event) related to a subject digital dispute event. The one or more API calls may use one or more dispute metadata characteristics (e.g., a transaction identification of the transaction dispute, a financial account number, a name of the card holder) associated with a subject digital dispute event (e.g., a transaction dispute) as query or search parameters to receive transaction data or event data back from the one or more merchant data systems in response to the one or more API calls, which may be passed to a corpus of transaction data.

Figure 5:
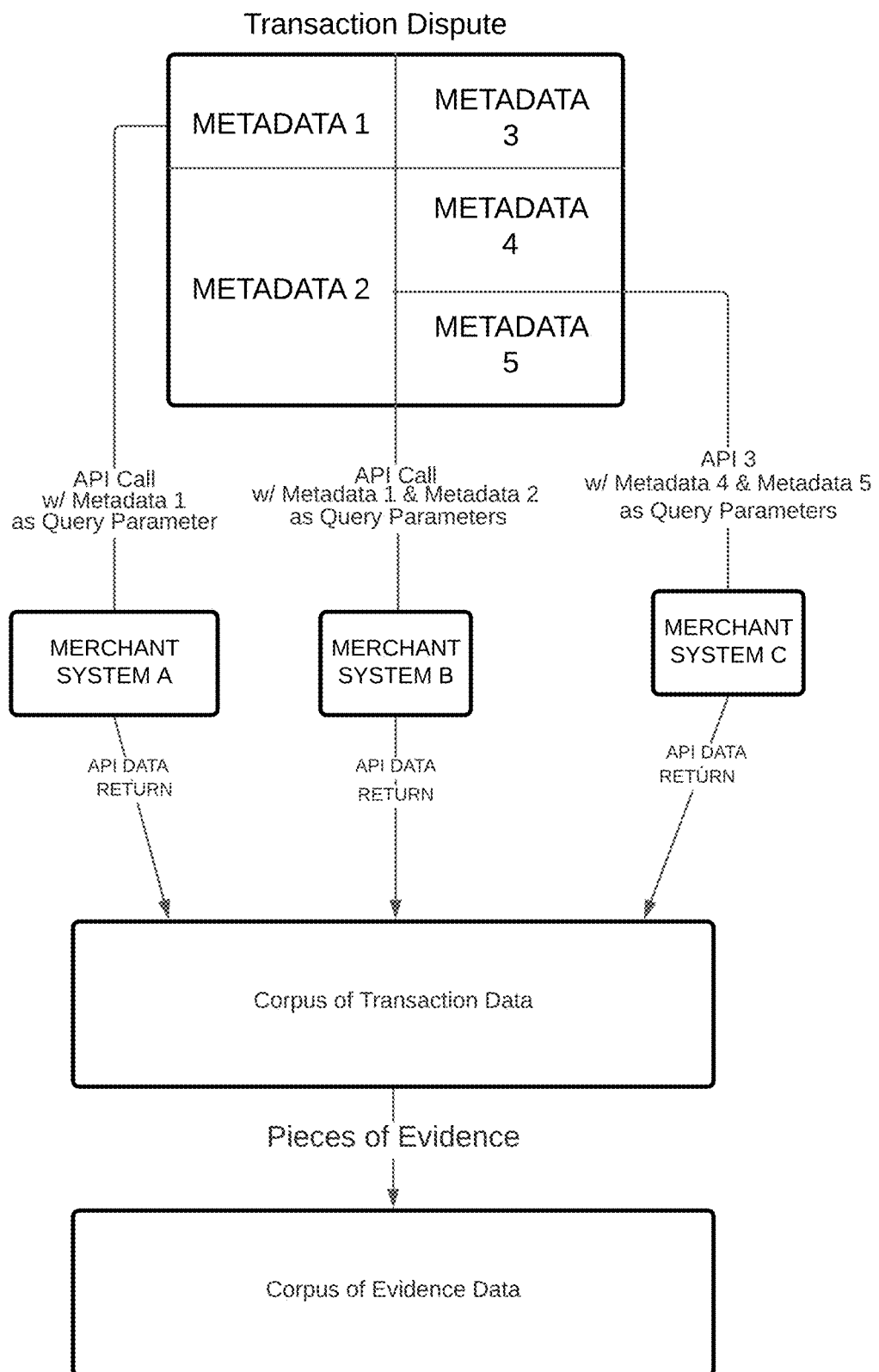
FIG. 5 illustrates an example representation of generating a corpus of transaction data and a corpus of evidence data in accordance with one or more embodiments of the present application.

For instance, in a non-limiting example, S230 may function to collect transaction data and/or event data associated with a transaction dispute (e.g., digital dispute event) by automatically generating and executing one or more API calls to one or more data sources or data systems of a merchant, as shown generally by way of example in FIG. 5. The query parameters of the one or more API calls may correspond to one or more distinct dispute metadata parameters of a transaction dispute (e.g., digital dispute event) to control the type of data returned and S230 may function to generate a corpus of transaction data based on the returned data.

In operation, S230 may function to generate one or more API calls to one or more merchant data sources with query parameters as a transaction identification of a target transaction dispute and an account number of a financial account user of the target transaction dispute. In response to the one or more API calls, S230 may function to receive transaction data or event data associated with the transaction identification of the target dispute and/or the account number of the user of the target transaction dispute and, based on transaction data returned by each API call of the one or more API calls, S230 may function to pass the transaction data and/or the event data to a corpus of transaction data.

Analyst Generation of a Corpus of Transaction Data

In a second implementation, S230 may function to generate a corpus of transaction data for a target digital dispute event by manually accessing one or more merchant data sources to obtain transaction data and/or event data associated with a digital dispute or digital event related to the target digital dispute event. In one such implementation, a human analyst may function to manually access one or more merchant systems or services to collect one or more of transaction details, order details, shipping details, and/or any event details involved with a target transaction dispute and, in response to, the human analyst collecting such transaction data or event data, the analyst may function to generate a corpus of transaction data for the target transaction dispute (e.g., digital dispute event).

It shall be noted that, in one or more embodiments, S230 may preferably function to manually generate a corpus of transaction data when at least a portion of the system 100 and/or the method 200 may be out of electronic communication with one or more merchant data systems.

Evidence Classifier|Classification of Transaction Data

Optionally, in one or more embodiments, S230 may function to generate a corpus of evidence data from a corpus of transaction data for a subject digital dispute event. In a preferred embodiment, S230 may function to label or map one or more pieces, and preferably each piece of transaction data of a corpus of transaction data as either evidence (e.g., a supporting feature that may aid in generating a dispute score) or not evidence (e.g., not a supporting feature that may aid in computing a dispute score) by implementing a machine learning-based evidence classifier. That is, in some embodiments, a corpus of evidence data may be a subset of a corpus of a transaction data.

In one or more embodiments, each piece of evidence data of a corpus of evidence data may be an informative or probative piece of data that increases a likelihood of a subject subscriber involved in a subject digital dispute event prevailing against the digital dispute event. Stated another way, each piece of evidence data of a corpus of evidence data may be an informative or probative piece of data that increases a likelihood of a target entity involved in the subject digital dispute event ruling in favor of the subscriber or merchant.

In operation, S230 may function to intelligently identify and/or determine the type of transaction data that may qualify as evidence on a per-dispute type basis. For instance, in one embodiment a target piece of transaction data may be labeled as evidence for a first dispute type, however, the same target piece of transaction data may be labeled as not evidence for a second dispute type. In response to detecting a piece of evidence, S230 may function to pass each piece of transaction data detected as evidence to a corpus of evidence data (e.g., an evidence corpus).

In a non-limiting example, a piece of transaction data in a corpus of transaction data may include a shipment tracking number and S230 may function to label the shipment tracking number as evidence. In another non-limiting example, a piece of transaction data of a corpus of transaction data may include log data or customer service interactions (e.g., emails or chats) associated with a customer using a product or service in a disputed transaction (e.g., digital dispute event) and S230 may function to label the log data or the customer service interaction as evidence. In another non-limiting example, a piece of transaction data in a corpus of transaction data may include a bank identification number (BIN) of the financial account user and S230 may function to label the bank identification number as evidence. In another non-limiting example, a piece of transaction data in a corpus of transaction data may include a dispute type of the transaction dispute and S230 may function to label the dispute type as evidence.

Additionally, or optionally, S230 may function to map each piece of evidence data of an evidence corpus into a specific evidence category. For instance, in one non-limiting example, a piece of evidence of an evidence corpus may include a tracking number for a package and S230 may function to map the tracking number to a shipping evidence category. In another non-limiting example, a piece of evidence data in an evidence corpus may be a full refund or a partial credit to a financial account user associated with a target transaction dispute (e.g., digital dispute event) and S230 may function to map the full refund or partial credit to a partial credit issued to financial account user evidence category. In another non-limiting example, a piece of evidence in an evidence corpus may include evidence of product usage and S230 may function to map the evidence of product or service usage to a compelling evidence category. In other words, in some embodiments, the corpus of evidence data may include granular evidence data and S230 may function to map the granular evidence data to evidence-specific categories.

2.40 Re-Scoring of Digital Dispute Events|Transaction Disputes

Figure 6:
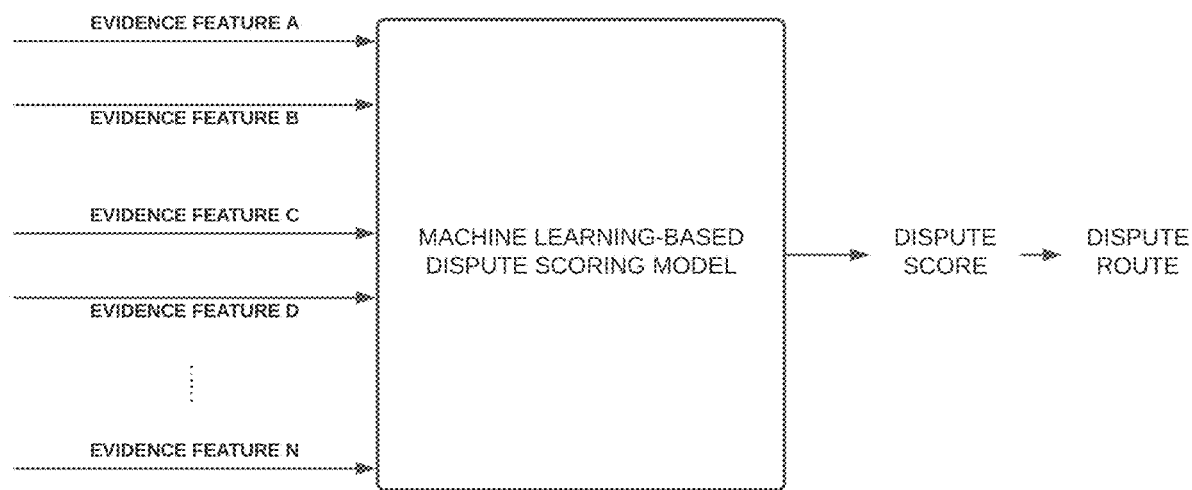
FIG. 6 illustrates an example representation of generating a dispute score for a transaction dispute in accordance with one or more embodiments of the present application.

Optionally, S240, which includes re-scoring of one or more transaction disputes, may function to re-score or update a baseline (or preliminary) dispute score computed for one or more transaction disputes (e.g., digital dispute events) of a dispute queue. In one or more embodiments, a digital dispute event (e.g., transaction dispute event) of a dispute queue may be re-scored or updated from the baseline (or preliminary dispute score computed in S220) in response to a detection that one or more of the forecasted evidence categories or service-proposed pieces of evidence data recommend or suggested by the service or system implementing the method 200 may be unavailable or non-obtainable for a subject digital dispute event. Accordingly, in one or more embodiments, S240 may function to re-score or update a baseline dispute score computed for each of the one or more transaction disputes based on a current state or available pieces of evidence data of the evidence corpus associated with a respective transaction dispute, as shown generally by way of example in FIG. 6.

In one or more embodiments, S240 may function to compute, by one of a plurality of distinct machine learning-based dispute scoring models, an updated or succeeding machine learning-based inference for a target digital dispute event based on a current state of evidence data included in a dispute response artifact and/or a current state of evidence data included in a corpus of evidence associated with the target digital dispute event.

In operation, S240 may function to implement a feature extractor or a feature extractor system that may function to extract an evidence feature dataset from a corpus of evidence data that may be converted to a feature vector dataset and used, as input, into one or more machine learning-based dispute scoring models or an ensemble of machine learning-based dispute scoring models, which may output a dispute score based on the current (or available) pieces of evidence of the evidence corpus or dispute response of a distinct transaction dispute event. In one or more embodiments, the evidence feature dataset extracted from a corpus of evidence data may vary on a per-dispute basis. In other words, the feature extractor or the feature extractor system may function to extract a corpus of probative evidence features based on dispute type.

It shall be noted that, in one or more embodiments, the feature dataset may comprise a plurality of features (e.g., twenty-one (21) features). In some embodiments, a majority of the extracted features may be binary based (e.g., the evidence corpus includes a tracking number for a package (e.g., 1), the evidence corpus does not include a tracking number for a package (e.g., 0), rather than numerically based. In other words, one or more of the machine learning-based dispute scoring models may function to evaluate the feature dataset at an evidence category level (e.g., shipping details present in the evidence corpus (e.g., 1 (e.g., yes) or 0 (e.g., no))), a partial credit issued to the financial account user present in the evidence corpus (e.g., 1 (e.g., yes) or 0 (e.g., no))).

Accordingly, one or more of the machine learning-based dispute scoring models may be configured with learnable parameters mapped to each of the plurality of features of the extracted evidence feature dataset. That is, in some embodiments, the machine learning-based dispute scoring models may compute an updated or succeeding dispute score based in part on collected pieces of evidence. For example, in one embodiment, a learned feature of a machine learning-based dispute scoring model may be mapped to a reason code of a transaction dispute. In another example, in the same or an alternative embodiment, a learned feature of a machine learning-based dispute scoring model may be mapped to a bank identification number (BIN) of the issuing bank of the financial account user.

Merchant Model|Subscriber-Specific Machine Learning-Based Dispute Model

In one or more embodiments, S240 may function to pass an extracted evidence feature dataset of a target digital dispute event to one of a plurality of dispute scoring machine learning models (e.g., the above-mentioned machine learning-based dispute scoring models) for re-scoring based on a cascading selection criterion of a digital dispute routing matrix (e.g., the above-mentioned hierarchical digital dispute routing matrix).

In one or more embodiments, S240 may function to pass the extracted evidence feature dataset to a subscriber-specific machine learning-based dispute scoring model for re-scoring when the subscriber-specific machine learning-based dispute scoring model may be trained on the bank identification number (BIN) of the extracted evidence feature dataset of a subject transaction dispute. Alternatively, in embodiments in which a subscriber-specific machine learning-based dispute scoring model is not trained to handle such evidence feature, S240 may function to still pass the extracted feature dataset to the subscriber-specific dispute scoring model for re-scoring if the subscriber-specific machine learning-based dispute scoring model is trained to handle a card type (e.g., Visa, Mastercard, etc.) of the extracted evidence feature dataset of the target transaction dispute.

It shall be noted that each distinct subscriber subscribing to a system or service implementing the method 200 may have a distinct subscriber-specific machine learning dispute scoring model trained to predict dispute scores and/or proposed pieces of evidence to include in a dispute response based on their own historical dispute response data. In other words, a subscriber-specific machine learning-based dispute scoring model may be trained on subscriber-specific transaction disputes, subscriber-specific dispute responses, and outcomes or results of the subscriber-specific dispute responses to predict dispute scores and/or generate a service-proposed corpus of evidence data.

It shall be further noted that the re-scored or updated dispute score may replace a previous baseline (or preliminary) dispute score displayed to a subscriber via a transaction dispute web-based interface.

Payment Processor Model|Subscriber-Agnostic Machine Learning-Based Model

Accordingly, in some embodiments, if a subscriber-specific dispute scoring machine learning-based model may not be adequately trained with subscriber-specific data to handle such bank identification number and/or card type of the extracted evidence feature dataset of a target transaction dispute, S240 may function to pass the evidence feature dataset to a subscriber-agnostic machine learning-based dispute scoring model for re-scoring if the subscriber-agnostic machine learning-based dispute scoring model is trained to handle the bank identification number of the extracted feature dataset of the target transaction dispute. Alternatively, if the subscriber-agnostic machine learning-based dispute scoring model may not be trained to handle such feature of a feature dataset, S240 may function to still pass the extracted feature dataset to the subscriber-agnostic machine learning-based dispute scoring model for re-scoring if the trained merchant dispute scoring model is trained to handle the card type of the extracted feature dataset of the target transaction dispute.

It shall be noted that each distinct subscriber-agnostic machine learning-based dispute scoring model may be trained on historical transaction disputes and historical dispute responses corresponding to a distinct payment processor. In other words, a subscriber-agnostic machine learning-based dispute scoring model may be trained on transaction disputes, dispute responses, and outcomes or results of the dispute responses of a plurality of distinct subscribers to the digital threat mitigation service that involve a distinct digital payment processor (e.g., digital event processor).

At least one technical benefit of predicting a dispute score for a target transaction dispute (e.g., digital dispute event) may inform a dispute handling route of the target transaction dispute, which may include a selection or an initialization of a dispute handling workflow.

2.50 Intelligent Generation of Dispute Response Artifacts|Intelligent Dispute Routing S250, which includes intelligent generation of dispute responses, may function to intelligently generate a dispute response artifact for dispute handling or dispute management of a target transaction dispute (e.g., digital dispute event).

Dispute Response Graphical User Interface

In one or more embodiments, via a graphical user interface or the like, a system implementing the method 200 may function to display a representation of a digital dispute queue that may include a plurality of distinct representations of digital dispute events associated with one or more subscribers to the digital threat mitigation service. In one or more embodiments, while displaying the representation of the digital dispute queue, S250 may function to receive an input from a subscriber selecting a distinct representation of the plurality of distinct representations of digital dispute events that corresponds to a digital dispute event that may be require a dispute response.

Figure 8:
FIG. 8 illustrates an example representation of instantiating a dispute response artifact in accordance with one or more embodiments of the present application.
Figure 9:
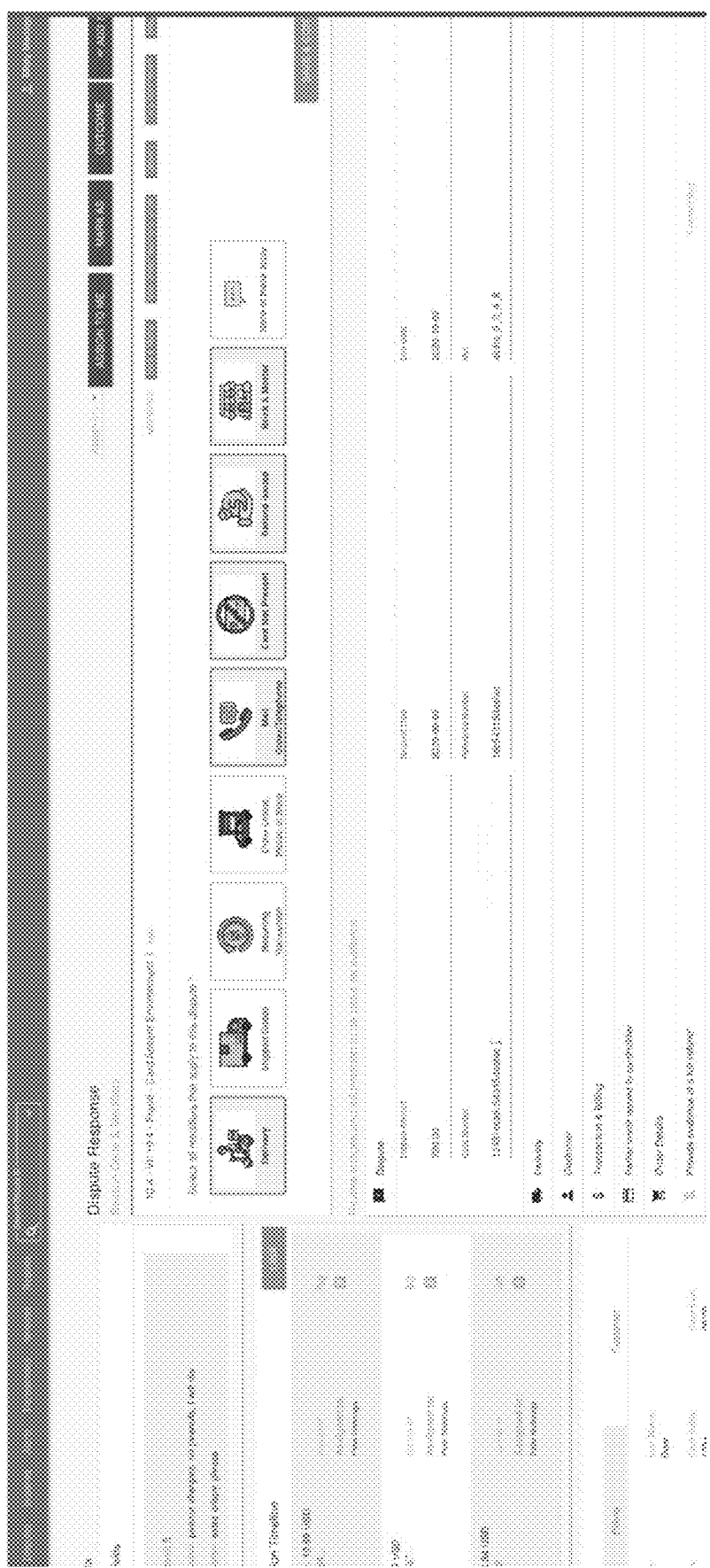
FIG. 9 illustrates another exemplary representation of instantiating a dispute response artifact in accordance with one or more embodiments of the present application.

Accordingly, based on or in response to the subscriber selection, S250 may function to instantiate, by one or more computers, a dispute response artifact that may include a plurality of distinct dispute response sections based on the dispute type of the digital dispute event to which the selected representation corresponds, as shown generally by way of example in FIG. 8 and FIG. 9. In one or more embodiments, S250 may function to generate, a dispute-specific response artifact for the digital dispute event to which the selected representation corresponds by manually installing or automatically installing, by one or more computers, selective subsets of evidence data from the one or more corpora of evidence data generated in S230 into at least a subset of the plurality of distinct dispute response sections of the dispute response artifact.

In one or more embodiments, via a web-based user interface accessible to a subscriber, S250 may function to simultaneously display the dispute-specific response artifact and a dispute response insights user interface element. In such embodiments, the dispute response insights user interface element may indicate one or more probative pieces of evidence data missing in the dispute-specific response artifact that, if included in the dispute-specific response artifact, increases a likelihood of the subscriber prevailing against the target digital dispute event to which the dispute-specific response artifact corresponds, as shown generally by way of example in FIG. 10 and FIG. 11. For instance, in a non-limiting example, the dispute response insights user interface element may include an evidence deficiency data structure that includes a distinct evidence domain-to-evidence summary mapping for distinct piece of evidence data or distinct evidence data type underrepresented or absent in the dispute-specific response artifact.

Additionally, in one or more embodiments, the dispute response insights user interface element may include a dispute response summary that textually indicates a current probability of the subscriber prevailing against the digital dispute event based on a current state of the evidence data included in the dispute-specific response artifact and/or a forward-looking probability of the subscriber prevailing against the digital dispute event if the dispute-specific response artifact is augmented to include one or more additional pieces of evidence data that resolves each distinct evidence-to-evidence domain summary mapping of the evidence deficiency data structure.

Figure 12:
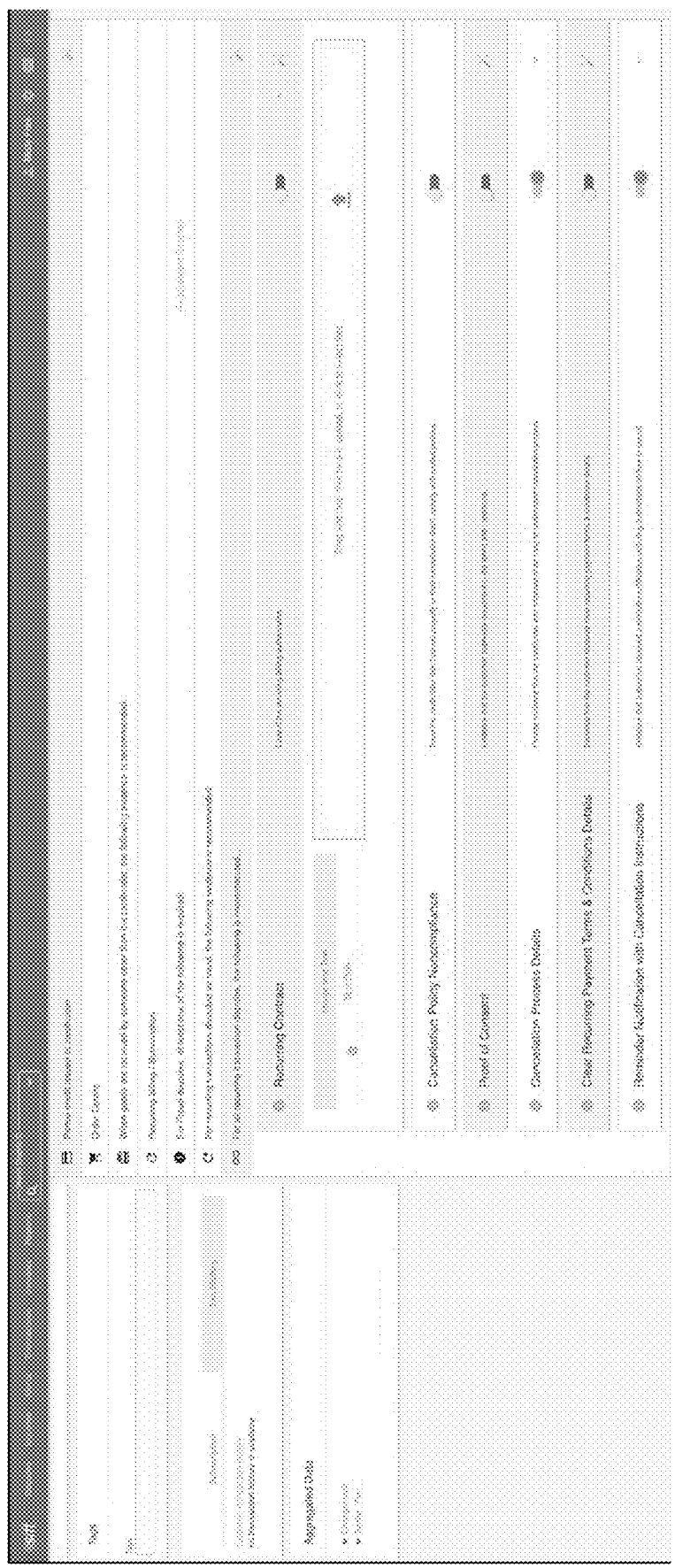
FIG. 12 illustrates an example representation of a graphical user interface emphasizing one or more dispute response sections of a dispute response artifact based on a dispute response insights user interface element.

It shall be noted that, in one or more embodiments, the system or service implementing the method 200 may function to visually emphasize (e.g., highlight, etc.), on the graphical user interface, a selective subset of distinct dispute response sections of the one or more distinct dispute response sections that map to the one or more probative pieces of evidence data included in the dispute response insights user interface element, as shown generally by way of example in FIG. 12. At least one technical benefit of visually emphasizing the selective subset of distinct dispute response sections indicates to the subscriber where to include one or more additional pieces of evidence data based on the dispute response insights user interface element.

Dispute Handling Route|Routing for Automatic Service or System-Generation of a Dispute Response In a first implementation, based on or in response to a machine learning-based dispute scoring model (e.g., a subscriber-specific dispute scoring machine learning model and/or a subscriber-agnostic dispute scoring machine learning-based model) computing a machine learning-based dispute inference comprising a dispute score for a subject digital dispute event that exceeds a dispute score threshold, S250 may function to execute an automated dispute response workflow that may function to automatically generate a dispute response artifact for the subject digital dispute event and/or automatically transmit the dispute response artifact to a target entity.

In one or more embodiments, a system or service implementing the method 200 may function to detect, by one or more computers, that a machine learning-based dispute score of a target transaction dispute (e.g., digital dispute event) may exceed a (high) dispute score threshold and in response to such detection, S250 may function to system-generate a dispute response with the one or more pieces of evidence data of the evidence data corpus generated for the target transaction dispute to challenge an illegitimate transaction dispute (e.g., digital dispute event) by attempting to prove the legitimacy of the transaction (e.g., digital event). That is, in digital dispute events where a high probability of prevailing in a transaction dispute case may be predicted, the system 100 and/or the method 200 may function to automatically generate a dispute response associated with the transaction dispute and transmit the dispute response to a target entity for review.

In a second implementation, S250 may function to extract, by one or more computers, a target piece of metadata (e.g., a transaction amount) from a subject digital dispute event and execute an automated dispute response workflow based on the target piece of metadata satisfying a workflow execution condition of the automated dispute response workflow. Accordingly, based on executing the automated dispute response workflow, S250 may function to automatically generate, by one or more computers, a dispute response artifact based on the one or more corpora of evidence data generated for the subject digital dispute event and/or automatically transmit, by the one or more computers, the dispute response artifact to a target entity.

Dispute Handling Route|Routing for Analyst Review

In one or more embodiments, based on or in response to a machine learning-based dispute scoring model (e.g., a subscriber-specific dispute scoring machine learning model and/or a subscriber-agnostic dispute scoring machine learning-based model) computing a machine learning-based dispute inference comprising a dispute score for a subject digital dispute event that is below a low dispute score threshold, S250 may function to route the subject digital dispute event to an analyst review queue. In such implementation, a system or service implementing the method 200 may function to detect that a predicted dispute score for a subject digital dispute event may be below a dispute score threshold and in response to such detection, S250 may function to intelligently route the subject digital dispute event (e.g., transaction dispute) to an analyst review queue for handling by an analyst. That is, in cases where a low probability of prevailing in a transaction dispute case may be predicted, the system 100 and/or the method 200 may function to route the target transaction dispute to an analyst to review the target transaction dispute and recommend additional evidence or evidence categories that may increase a likelihood of prevailing in the disputed transaction or advise the merchant to accept the liability of the transaction dispute.

Dispute Handling Route|Routing for Evidence Evaluation

In one or more embodiments, based on or in response to a machine learning-based dispute scoring model (e.g., a subscriber-specific dispute scoring machine learning model and/or a subscriber-agnostic dispute scoring machine learning-based model) computing a machine learning-based dispute inference comprising a dispute score for a subject digital dispute event that is between a dispute score between a (low) dispute score threshold and a (high) dispute score threshold, S250 may function to execute an evidence evaluation workflow. In such workflow, a service or system implementing the method 200 may function to evaluate, by one or more computers, a current state of the evidence corpus (or dispute response artifact) and identify which pieces of evidence or evidence categories might be missing from the evidence corpus (or dispute response artifact) and suggest to a merchant or subscriber to include such evidence or categories of evidence in a dispute response to increase a probability of prevailing against a disputed transaction.

It shall be noted that, in one or more embodiments, S250 may function to generate an incomplete dispute response associated with a target transaction dispute and in portions of the dispute response where evidence or evidence categories might be missing but recommend by the evidence evaluation workflow, S250 may function to prompt or create a visual indication to the merchant of such evidence or evidence categories in the generated, but incomplete dispute response for action or review by a merchant (e.g., subscriber).

Probability Contribution of Evidence

Additionally, in one or more embodiments of a dispute handing route (e.g., an analyst review route, an evidence evaluation route, etc.), S250 may function to map a probability contribution to each evidence category recommend by an analyst or a system or service implementing the method 200. In some embodiments, the probability contribution may be a metric that may inform an analyst and/or a merchant of an evidence effectiveness (or usefulness) value of including such piece of evidence or not including such piece of evidence in a dispute response.

Stated another way, the probability contribution may be a metric that may inform an analyst or merchant of an evidence benefit or evidence impact value of including a target piece of evidence in relation to the amount of time required to obtain the target piece of evidence.

In one example, a probability contribution metric may be computed for each piece of evidence recommended or suggested by an analyst or a system or service implementing the method 200 using a score simulation module. In such example, the score simulation module may be configured to process a plurality of simulations runs with each simulation run representing a distinct collection of evidence categories (e.g., simulation run "A" may include evidence category I, evidence category II, and evidence category III, simulation run "B" may include evidence category II and evidence category III, simulation run "C" may include evidence category I, etc.) and compute a simulated dispute score based on evidence provided in each distinct simulation run. Accordingly, in response to simulating a dispute score for each of the plurality of simulation runs, the simulation module may be able to compute and/or expose a quantitative effect or a probability contrition that each piece of evidence may contribute to a dispute score.

In another implementation of a score simulation module, S250 may function to compute a first dispute score for a target transaction dispute with the current pieces of evidence of the evidence corpus associated with the target transaction dispute. Accordingly, for each additional piece of evidence recommended and/or added by either an analyst or a service or system implementing the method 200, S250 may function to simulate a pseudo-score based on the addition of the piece of evidence. Accordingly, S250 may function to compute a delta between the pseudo-score and the first dispute score, which may be an indication of a probability contribution of the additional piece of evidence.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A machine learning-based method for accelerating a disposition of an inbound digital dispute event, the method comprising:
    identifying, by one or more computers, a digital dispute event and a digital event processor associated with a digital event that occurred between a target online user and a subscriber to a digital threat mitigation service;
    routing, by the one or more computers, the digital dispute event to one of (1) a subscriber-specific machine learning-based dispute scoring model that is trained on historical dispute response data of the subscriber and (2) a subscriber-agnostic machine learning-based dispute scoring model that is trained on historical dispute response data of a plurality of distinct subscribers that involve the digital event processor based on the digital dispute event satisfying a routing protocol of a hierarchical digital dispute routing matrix, wherein:
        the hierarchical digital dispute routing matrix includes a plurality of distinct routing protocols in a predetermined routing sequence that prioritizes a routing of the digital dispute event to the subscriber-specific machine learning-based dispute scoring model over the subscriber-agnostic machine learning-based dispute scoring model;
        the digital dispute event is routed to the subscriber-specific machine learning-based dispute scoring model when the digital threat mitigation service determines that the subscriber has historically prevailed in historical digital dispute events analogous to the digital dispute event, and
        the digital dispute event is routed to the subscriber-agnostic machine learning-based dispute scoring model when the digital threat mitigation service determines that the subscriber has historically underperformed in the historical digital dispute events analogous to the digital dispute event;
    computing, by the one of the subscriber-specific machine learning-based dispute scoring model and the subscriber-agnostic machine learning-based dispute scoring model, a preliminary machine learning-based dispute inference based on one or more features extracted from the digital dispute event, wherein:
        the preliminary machine learning-based dispute inference relates to a probability of the subscriber prevailing against the digital dispute event based on each piece of evidence data of a service-proposed corpus of evidence data being available to include in a dispute response artifact;
    generating the dispute response artifact based on the digital dispute event, wherein the generating includes installing one or more obtainable pieces of evidence data associated with the digital event into one or more distinct dispute response sections of the dispute response artifact;
    computing, by a target one of the subscriber-specific machine learning-based dispute scoring model and the subscriber-agnostic machine learning-based dispute scoring model, an updated machine learning-based dispute inference for the digital dispute event based on a current state of the evidence data included in the dispute response artifact; and
    transmitting, by the one or more computers, the dispute response artifact to a target entity based on the updated machine learning-based dispute inference satisfying a dispute response submittal criterion.

2. The method according to claim 1, wherein:
    each of the one or more obtainable pieces of evidence data corresponds to an informative or probative piece of data that increases a likelihood of determining the digital event as a valid digital event.

3. The method according to claim 1, wherein
    the preliminary machine learning-based dispute inference comprises a preliminary dispute score value; and
    the updated machine learning-based dispute inference comprises an updated dispute score value.

4. The method according to claim 1, wherein:
    the subscriber-specific machine learning-based dispute scoring model is one of a plurality of distinct subscriber-specific machine learning-based dispute scoring models of the digital threat mitigation service, wherein each of the plurality of distinct subscriber-specific machine learning-based dispute scoring models is trained on historical dispute response data of a distinct subscriber; and
    the subscriber-agnostic machine learning-based dispute scoring model is one of a plurality of distinct subscriber-agnostic machine learning-based dispute scoring models of the digital threat mitigation service, wherein each of the plurality of distinct subscriber-agnostic machine learning-based dispute scoring models is trained on historical dispute response data that involves a distinct digital event processor.

5. The method according to claim 1, further comprising:
    displaying, on a web-based user interface of the digital threat mitigation service, the dispute response artifact and a dispute response insights user interface element, wherein the dispute response insights user interface element indicates one or more probative pieces of evidence data missing in the dispute response artifact that, if included in the dispute response artifact, increases a likelihood of the subscriber prevailing against the digital dispute event.

6. The method according to claim 5, further comprising:
visually emphasizing, on the web-based user interface, a selective subset of distinct dispute response sections of the one or more distinct dispute response sections that map to the one or more probative pieces of evidence data missing in the dispute response artifact,
wherein visually emphasizing the selective subset of distinct dispute response sections indicates to the subscriber where to include one or more additional pieces of evidence data based on the dispute response insights user interface element.

7. The method according to claim 1, further comprising:
displaying, via a web-based user interface of the digital threat mitigation service, a representation of the dispute response artifact that includes:
   (i) each of the one or more distinct dispute response sections of the dispute response artifact;
   (ii) each obtainable piece of evidence data of the one or more obtainable pieces of evidence data included in the one or more distinct dispute response sections of the dispute response artifact; and
   (iii) a dispute response insights user interface element integrally displayed within the representation of the dispute response artifact.

8. The method according to claim 7, wherein:
the dispute response insights user interface element includes:
   (iii-a) an evidence deficiency data structure that includes a distinct evidence domain-to-evidence summary mapping for each distinct piece of evidence data of the service-proposed corpus of evidence data underrepresented in the dispute response artifact; and
   (iii-b) a textual dispute response summary that indicates (1) a current probability of the subscriber prevailing against the digital dispute event based on the current state of the evidence data included in the dispute response artifact and (2) a forward-looking probability of the subscriber prevailing against the digital dispute event if the dispute response artifact is augmented to include one or more additional pieces of evidence data that resolves each distinct evidence-to-evidence domain summary mapping of the evidence deficiency data structure.

9. The method according to claim 1, further comprising:
evaluating the one or more obtainable pieces of evidence data included in the dispute response artifact against the service-proposed corpus of evidence data;
identifying that the one or more obtainable pieces of evidence data included in the dispute response artifact excludes at least a subset of evidence data of the service-proposed corpus of evidence data based on the evaluation; and
wherein the computing of the updated machine learning-based dispute inference is further based on the identifying.

10. The method according to claim 1, further comprising:
based on determining a difference in evidence data between the service-proposed corpus of evidence data and the one or more obtainable pieces of evidence data:
   generating, by the one or more computers, an evidence feature dataset that represents the one or more obtainable pieces of evidence data;
   providing, as model input, the evidence feature dataset to the target one of the subscriber-specific machine learning-based dispute scoring model and the subscriber-agnostic machine learning-based dispute scoring model.

11. The method according to claim 10, wherein:
computing the updated machine learning-based dispute inference for the digital dispute event is further based on the evidence feature dataset.

12. The method according to claim 11, wherein:
computing the updated machine learning-based dispute inference further includes:
   (a) using the subscriber-specific machine learning-based dispute scoring model when the subscriber-specific machine learning-based dispute scoring model is trained on a bank identification number (BIN) used in the digital event,
   (b) using the subscriber-specific machine learning-based dispute scoring model when the subscriber-specific machine learning-based dispute scoring model is trained on a card type used in the digital event,
   (c) using the subscriber-agnostic machine learning-based dispute scoring model when (c-i) the subscriber-specific machine learning-based dispute scoring model is not trained on the bank identification number (BIN) used in the digital event and (c-ii) the subscriber-agnostic machine learning-based dispute scoring model is trained on the bank identification number (BIN) used in the digital event, and
   (d) using the subscriber-agnostic machine learning-based dispute scoring model when (d-i) the subscriber-specific machine learning-based dispute scoring model is not trained on the card type used in the digital event and (d-ii) the subscriber-agnostic machine learning-based dispute scoring model is trained on the card type used in the digital event.

13. The method according to claim 11, wherein:
a majority of evidence data features of the evidence feature dataset are binary-based evidence data features.

14. The method according to claim 1, further comprising:
extracting, by the one or more computers, a plurality of distinct event attributes associated with the digital dispute event;
automatically executing, by the one or more computers, one or more distinct application programming interface (API) calls using, at least, a subset of the plurality of distinct event attributes as API search parameters;
in response to automatically executing the one or more distinct application programming interface (API) calls, generating one or more corpora of evidence data based on a return of data by each respective application programming interface call of the one or more distinct application programming interface (API) calls.

15. The method according to claim 14, wherein:
the one or more corpora of evidence data includes the one or more obtainable pieces of evidence data.

16. The method according to claim 14, wherein:
the preliminary machine learning-based dispute inference includes a dispute score value,
the dispute response artifact is automatically generated by the digital threat mitigation service based on (i) the one or more corpora of evidence data and (ii) the dispute score value satisfying a minimum dispute score threshold value.

* * * * *